US 8,749,647 B2

(12) United States Patent
Harikae et al.

(10) Patent No.: US 8,749,647 B2
(45) Date of Patent: Jun. 10, 2014

(54) IMAGE CAPTURING DEVICE AND IMAGE CAPTURING METHOD

(75) Inventors: Masato Harikae, Kanagawa (JP); Yuya Matsubara, Kanagawa (JP)

(73) Assignee: KYOCERA Corporation, Kyoto (JP)

(*) Notice: Subject to any disclaimer, the term of this patent is extended or adjusted under 35 U.S.C. 154(b) by 29 days.

(21) Appl. No.: 13/264,670

(22) PCT Filed: Apr. 20, 2010

(86) PCT No.: PCT/JP2010/057026
§ 371 (c)(1),
(2), (4) Date: Oct. 14, 2011

(87) PCT Pub. No.: WO2010/123011
PCT Pub. Date: Oct. 28, 2010

(65) Prior Publication Data
US 2012/0033100 A1 Feb. 9, 2012

(30) Foreign Application Priority Data

Apr. 20, 2009 (JP) ................................ 2009-101888
Apr. 20, 2009 (JP) ................................ 2009-101889
Apr. 20, 2009 (JP) ................................ 2009-101890

(51) Int. Cl.
H04N 5/228 (2006.01)
H04N 5/222 (2006.01)

(52) U.S. Cl.
USPC .................................. 348/208.6; 348/333.12

(58) Field of Classification Search
USPC .................. 348/333.06, 333.12, 208.3, 208.6
See application file for complete search history.

(56) References Cited

U.S. PATENT DOCUMENTS

| 8,619,146 | B2* | 12/2013 | Molgaard | 348/208.6 |
| 2005/0168583 | A1* | 8/2005 | Thomason | 348/208.4 |
| 2006/0197843 | A1 | 9/2006 | Yoshimatsu | |
| 2007/0298850 | A1* | 12/2007 | Miyata et al. | 455/575.3 |
| 2008/0111889 | A1* | 5/2008 | Fujita et al. | 348/208.5 |
| 2008/0131107 | A1* | 6/2008 | Ueno | 396/50 |

(Continued)

FOREIGN PATENT DOCUMENTS

| JP | 10-079882 A | 3/1998 |
| JP | 10-268389 A | 10/1998 |

(Continued)

OTHER PUBLICATIONS

International Search Report; PCT/JP2010/057026; Aug. 3, 2010.

(Continued)

Primary Examiner — Tuan Ho
Assistant Examiner — Shahbaz Nazrul
(74) Attorney, Agent, or Firm — Studebaker & Brackett PC

(57) ABSTRACT

One of objects of the invention is to provide an image capturing device and an image capturing method, which is capable of capturing an image of the target at the proper angle by a simple device configuration. An image capturing device of the present invention includes: a housing; an image capturing unit capturing an image of a target; an image display unit that is capable of displaying the image; a position detection unit detecting a position of the housing; and an image correction unit correcting an original image acquired from the image capturing unit based on the position detected by the position detection unit, when a preview image of the captured image is displayed on the image display unit.

19 Claims, 19 Drawing Sheets

(56) References Cited

U.S. PATENT DOCUMENTS

Figure 1:
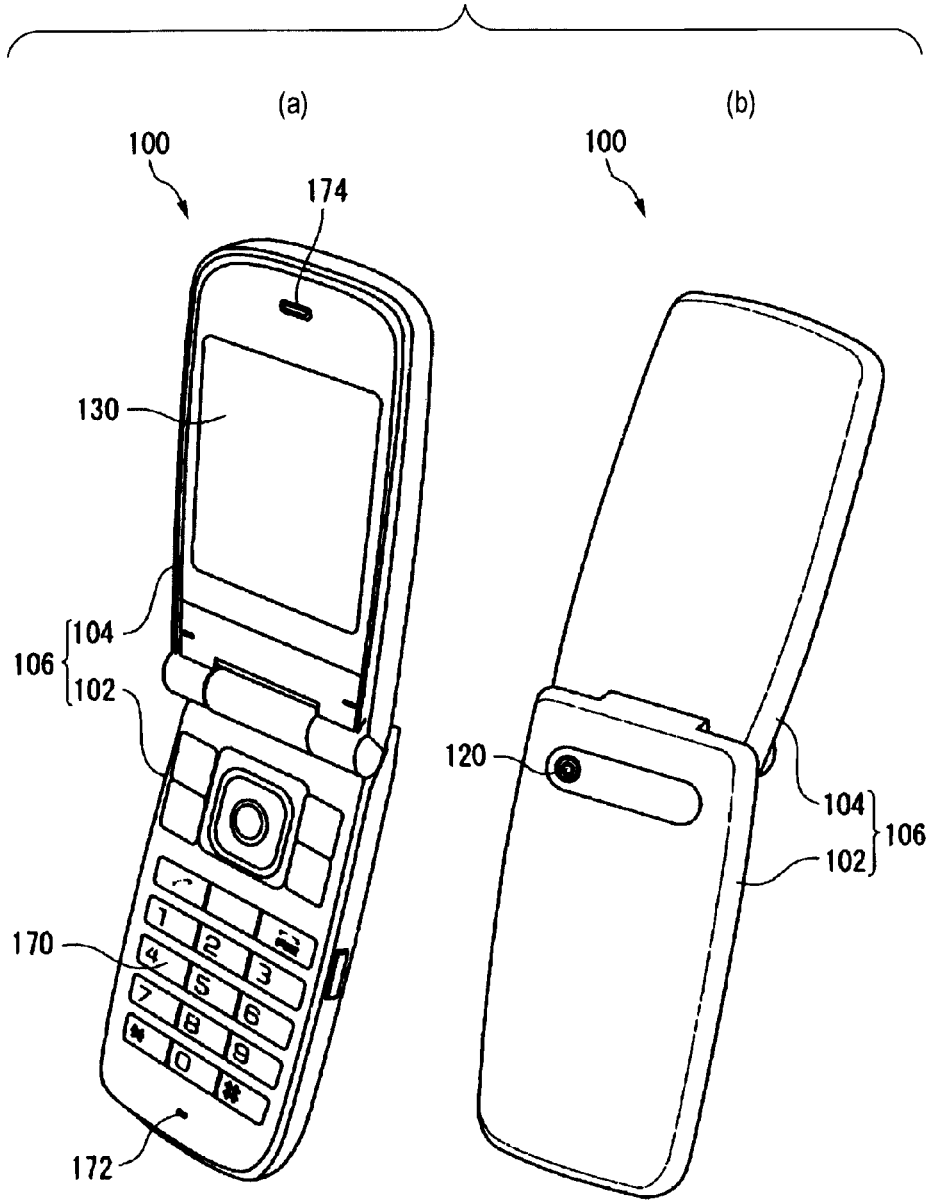

| | | | | |
|---|---|---|---|---|
| 2010/0231741 | A1* | 9/2010 | Suzuki | 348/222.1 |
| 2010/0231777 | A1* | 9/2010 | Shintani et al. | 348/333.06 |
| 2011/0090390 | A1* | 4/2011 | Narita | 348/333.03 |
| 2011/0115933 | A1* | 5/2011 | Yamazaki et al. | 348/220.1 |
| 2011/0149094 | A1* | 6/2011 | Chen et al. | 348/208.3 |
| 2011/0310283 | A1* | 12/2011 | Shiozaki | 348/333.06 |
| 2012/0105668 | A1* | 5/2012 | Velarde et al. | 348/223.1 |
| 2013/0002923 | A1* | 1/2013 | Kanma et al. | 348/333.02 |

FOREIGN PATENT DOCUMENTS

| | | | |
|---|---|---|---|
| JP | 2005348212 | A | 12/2005 |
| JP | 2006-245726 | A | 9/2006 |
| JP | 2006-279373 | A | 10/2006 |
| JP | 2007-006162 | A | 1/2007 |
| JP | 2008-053833 | A | 3/2008 |
| JP | 2008-099147 | A | 4/2008 |
| JP | 2009-033223 | A | 2/2009 |

OTHER PUBLICATIONS

An Office Action "Notice of Reasons for Rejection" issued by the Japanese Patent Office on Jul. 23, 2013, which corresponds to Japanese Patent Application No. 2009-101888 and is related to U.S. Appl. No. 13/264,670 with Concise Explanation.

An Office Action "Notice of Reasons for Rejection" issued by the Japanese Patent Office on Jul. 23, 2013, which corresponds to Japanese Patent Application No. 2009-101889 and is related to U.S. Appl. No. 13/264,670 with Concise Explanation.

An Office Action "Notice of Reason for Rejection" issued by the Japanese Patent Office on Mar. 11, 2014, which corresponds to Japanese Patent Application No. 2009-101888 and is related to U.S. Appl. No. 13/264,670 with Concise Explanation.

An Office Action "Notice of Reasons for Rejection" issued by the Japanese Patent Office on Mar. 11, 2014, which corresponds to Japanese Patent Application No. 2009-101889 and is related to U.S. Appl. No. 13/264,670 with Concise Explanation.

* cited by examiner

IMAGE CAPTURING DEVICE AND IMAGE CAPTURING METHOD

TECHNICAL FIELD

The present invention relates to an image capturing device and an image capturing method for capturing an image of a target.

BACKGROUND ART

In recent image capturing devices such as a digital camera, a mobile phone a PHS (Personal Handy-phone System), and a PDA (Personal Digital Assistant), which have a camera, it is possible for a user to perform image capturing while seeing an image (preview image) of a target displayed on a display unit (liquid crystal display or the like), instead of a finder.

In general, when capturing an image of a target, it is preferable to fit the horizontal direction of the target to the left-right direction of the image in view that the image to be captured can be easily seen. When capturing an image by using a mobile phone or others in consideration of that, a user needs to keep an attitude of the mobile phone or others in the horizontal position.

For example, Patent Document 1 discloses an electronic camera capable of capturing an image having a set tilt angle, by driving a lens barrel unit rotation mechanism, which is provided with a capturing lens unit or others.

RELATED ART

Patent Document

Patent Document 1: Japanese Patent Application Publication No. Hei 10-268389

DISCLOSURE OF THE INVENTION

Technical Problems to be Solved by the Invention

However, since the lens barrel unit rotation mechanism of Patent Document 1 requires a motor or a gear, there is limit to realize miniaturization. Accordingly, it would be difficult to employee the lens barrel unit rotation mechanism for a mobile phone or others. On the other hand, it is not easy for a user to keep manually the mobile phone or others in the horizontal position while seeing an image of a target displayed on a display unit.

The present invention is made in consideration of the problems, and its object is to provide an image capturing device and an image capturing method, which are capable of capturing an image of the target at the proper angle by a simple device configuration.

Means to Solve the Problems

In order to solve the foregoing problems, one aspect of the image capturing device of the present invention includes: a housing; an image capturing unit capturing an image of a target; an image display unit that is capable of displaying the image; a position detection unit detecting a position of the housing; and an image correction unit correcting an original image acquired from the image capturing unit based on the position detected by the position detection unit, when a preview image of the captured image is displayed on the image display unit.

One aspect of the image capturing method of the present invention includes capturing an image of a target by using an image capturing unit of an image capturing device, detecting a position of the image capturing device, and correcting an original image acquired from the image capturing unit based on the detected position when a preview image of the captured image is displayed on a display unit of the image capturing device.

Effect of the Invention

According to the present invention, it is possible to provide an image capturing device and an image capturing method, which are capable of capturing an image of the target at the proper angle by a simple device configuration.

BRIEF DESCRIPTIONS OF THE DRAWINGS

Figure 2:
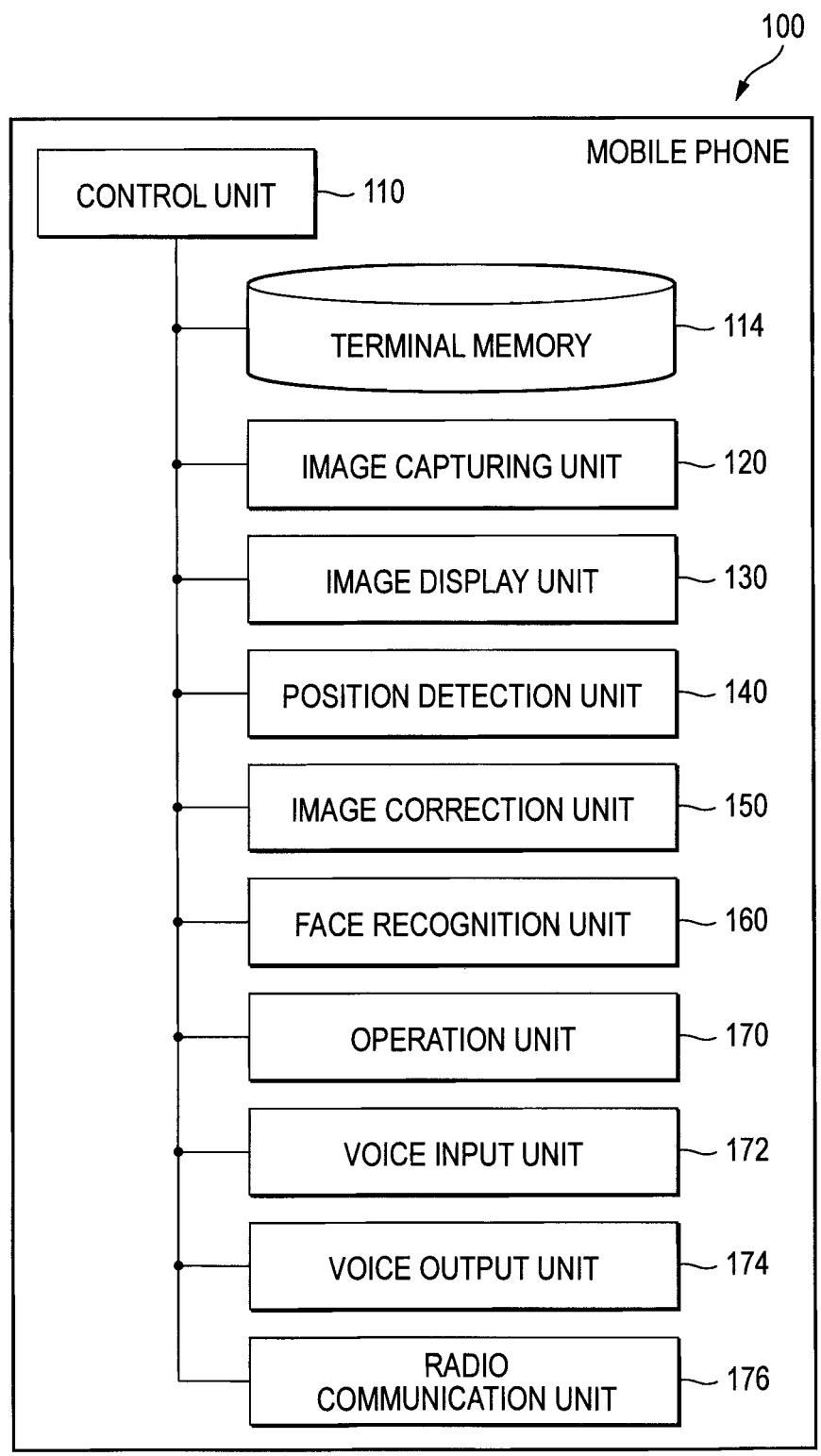
Figure 3:
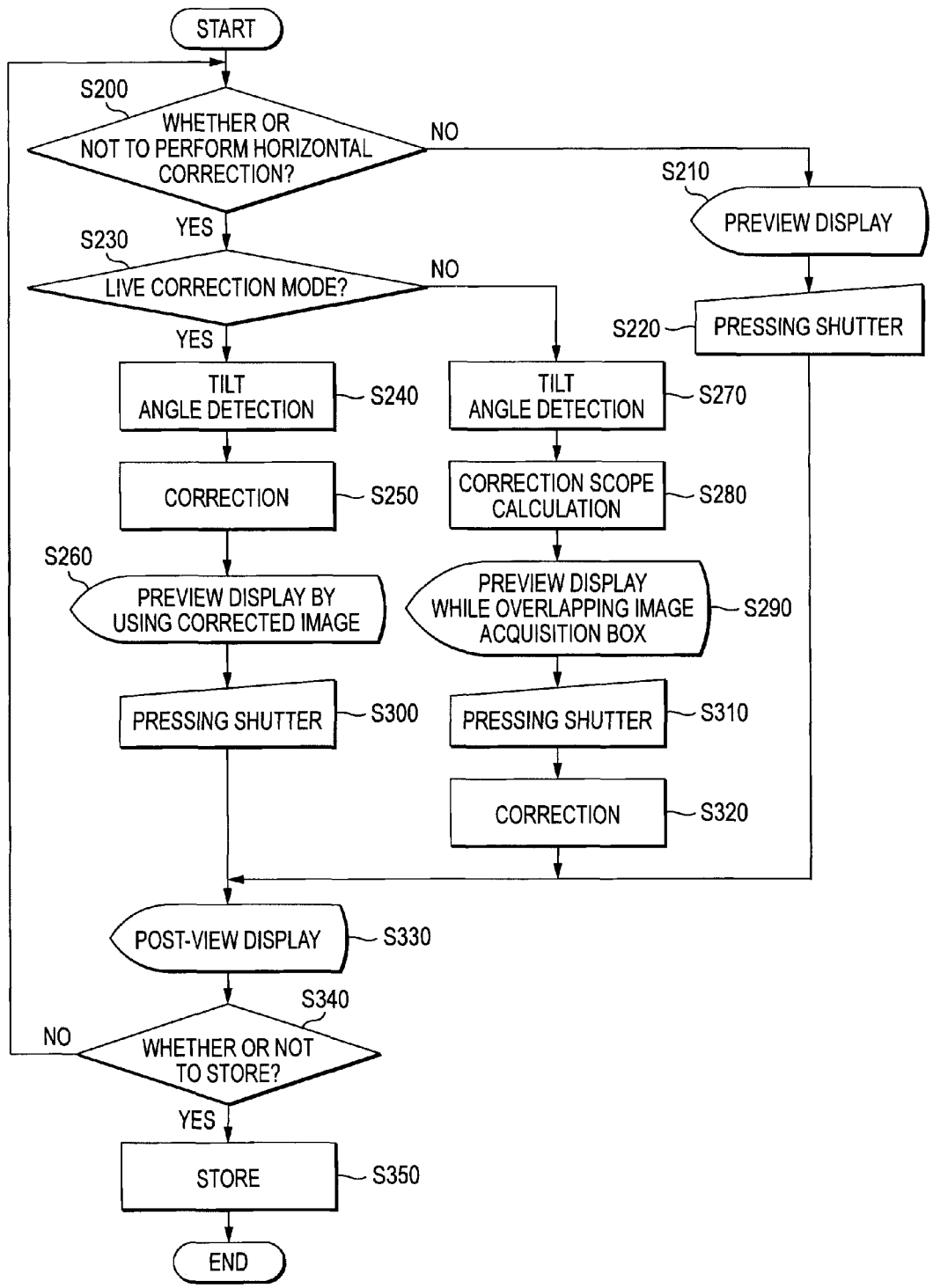
Figure 4:
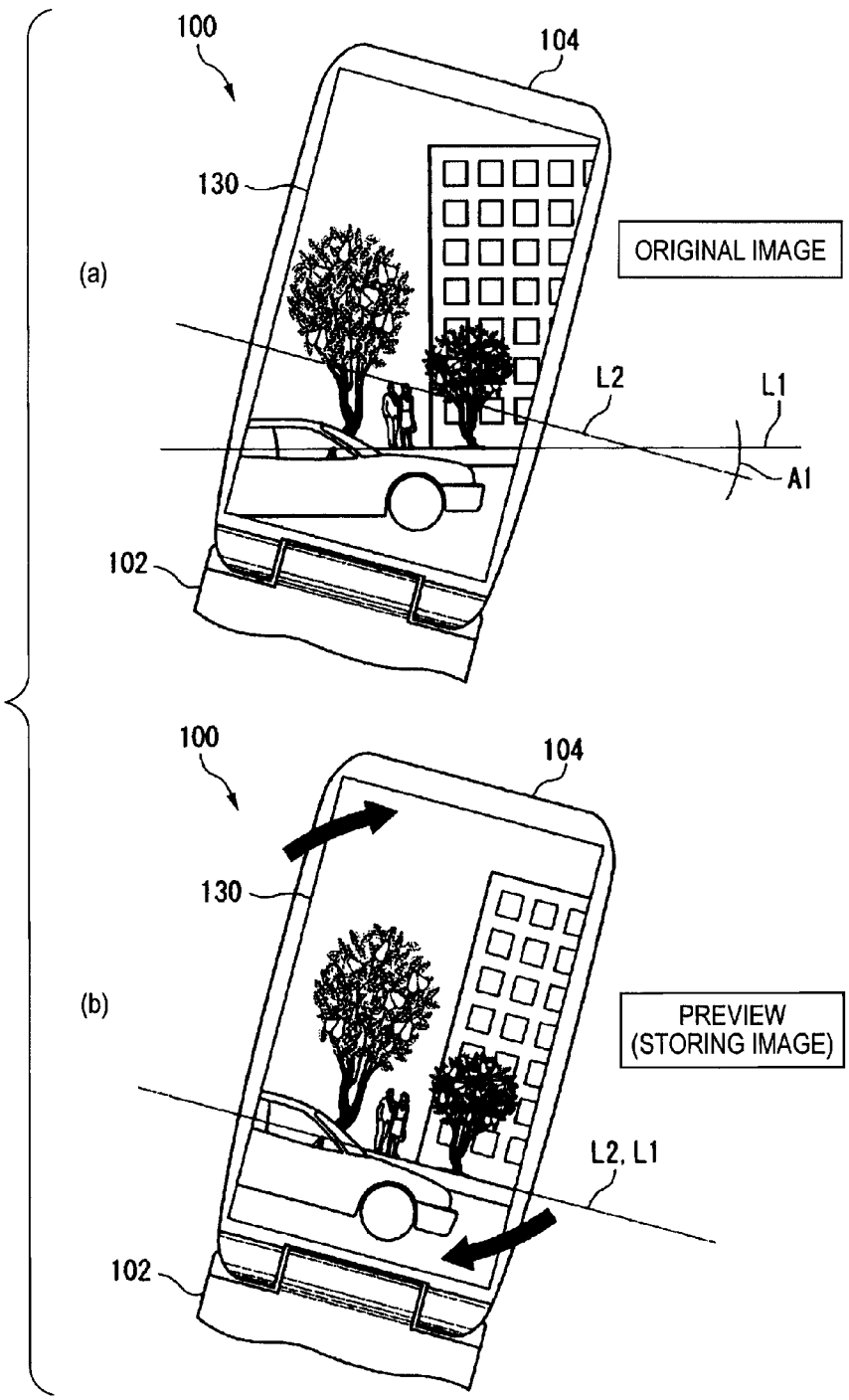
Figure 5:
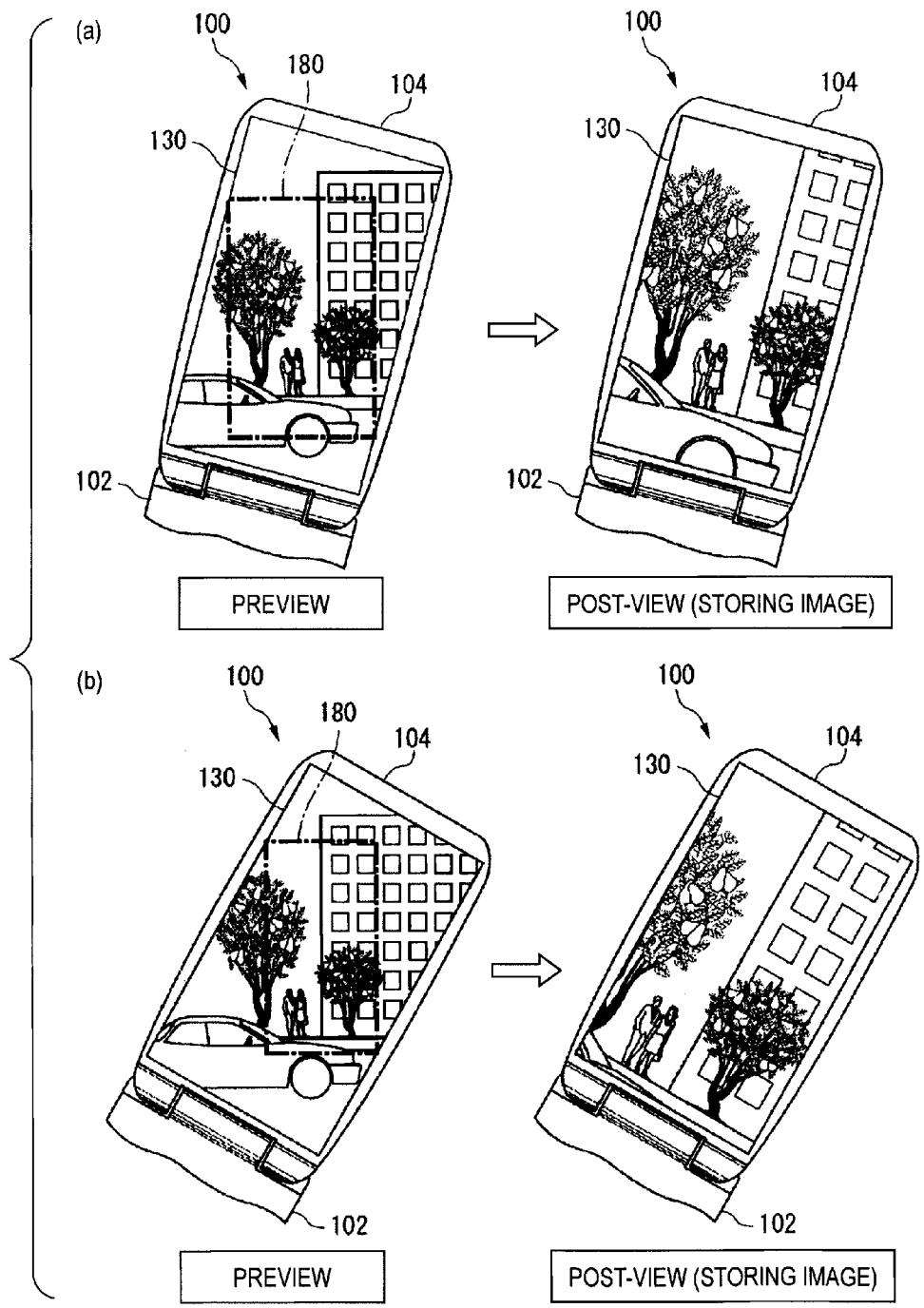
Figure 6:
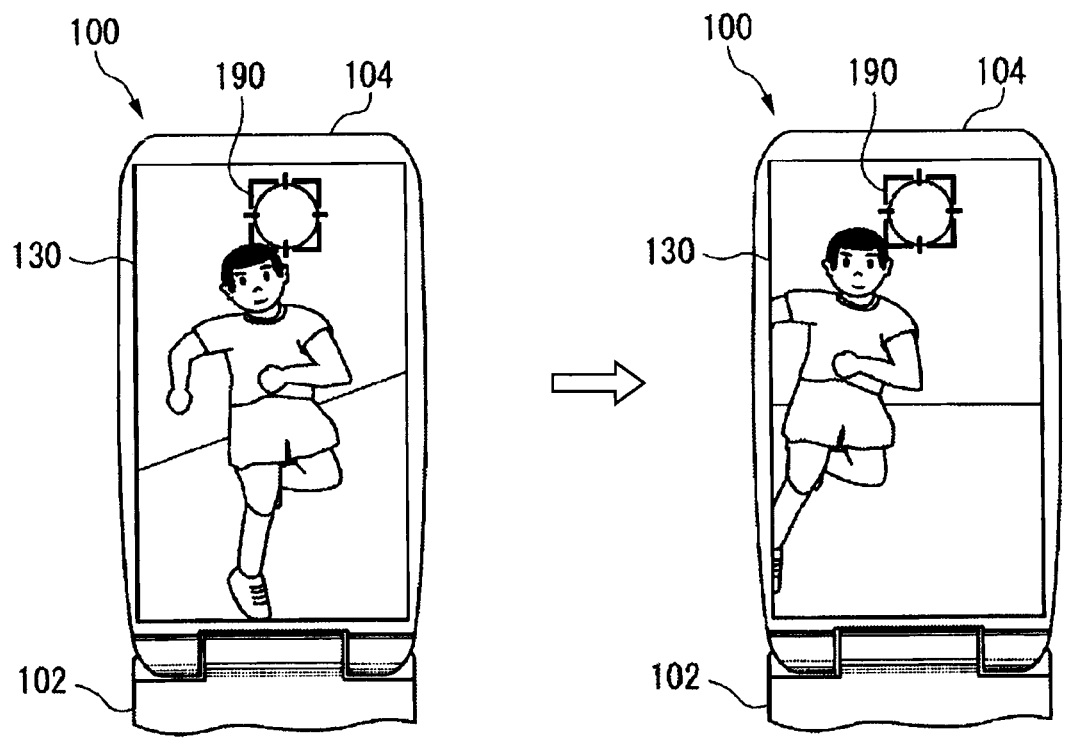
Figure 7:
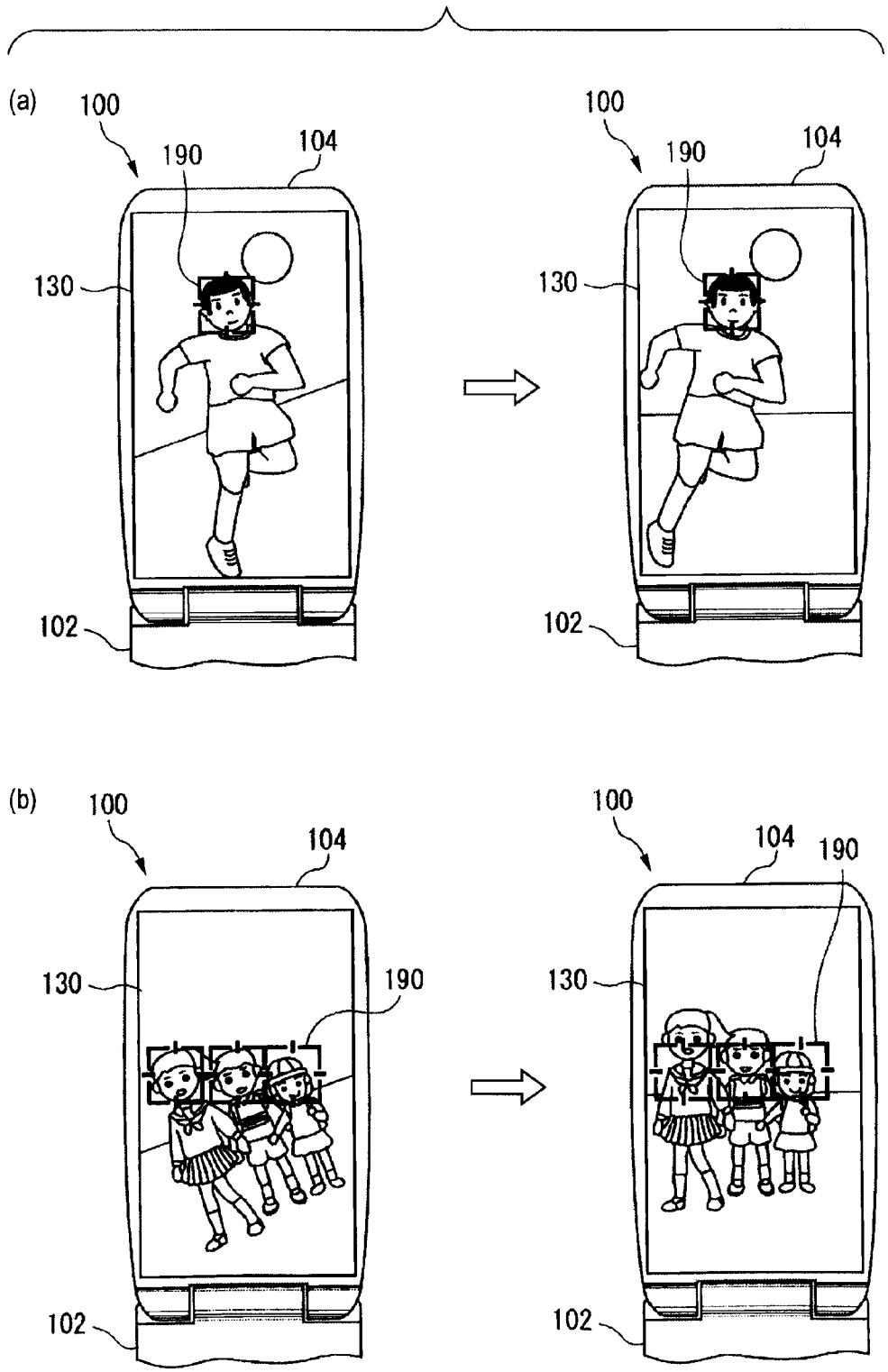
Figure 8:
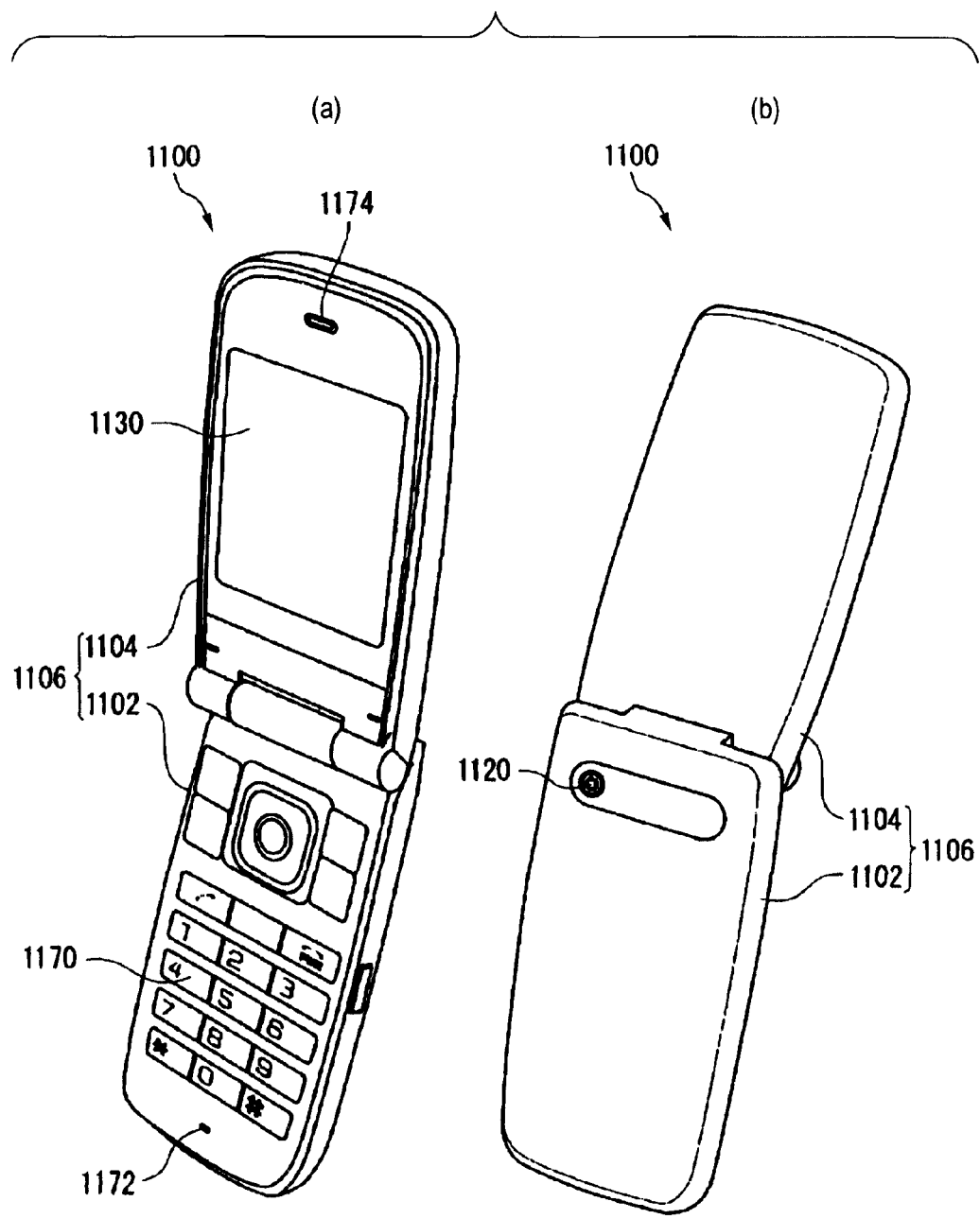
Figure 9:
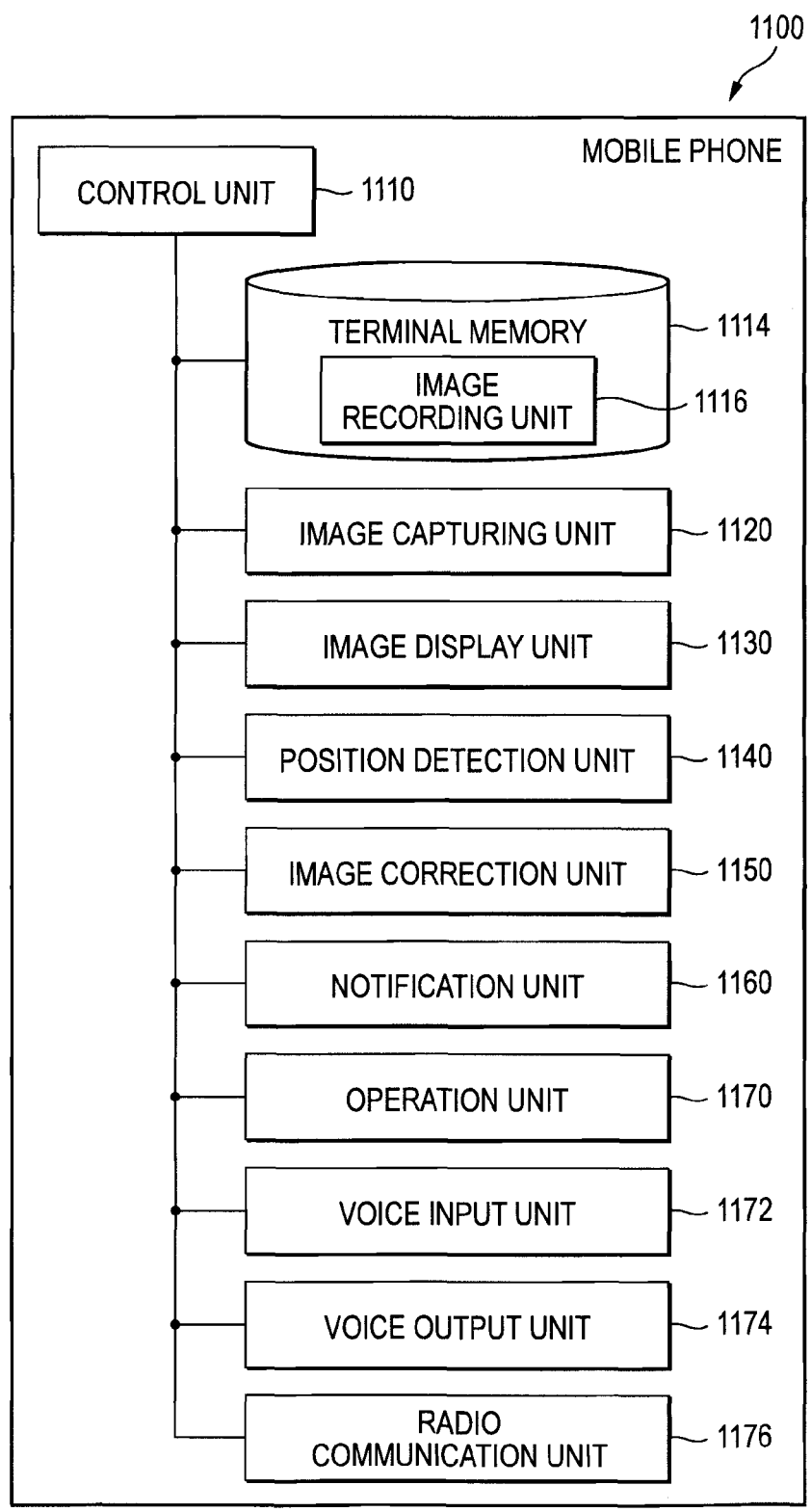
Figure 10:
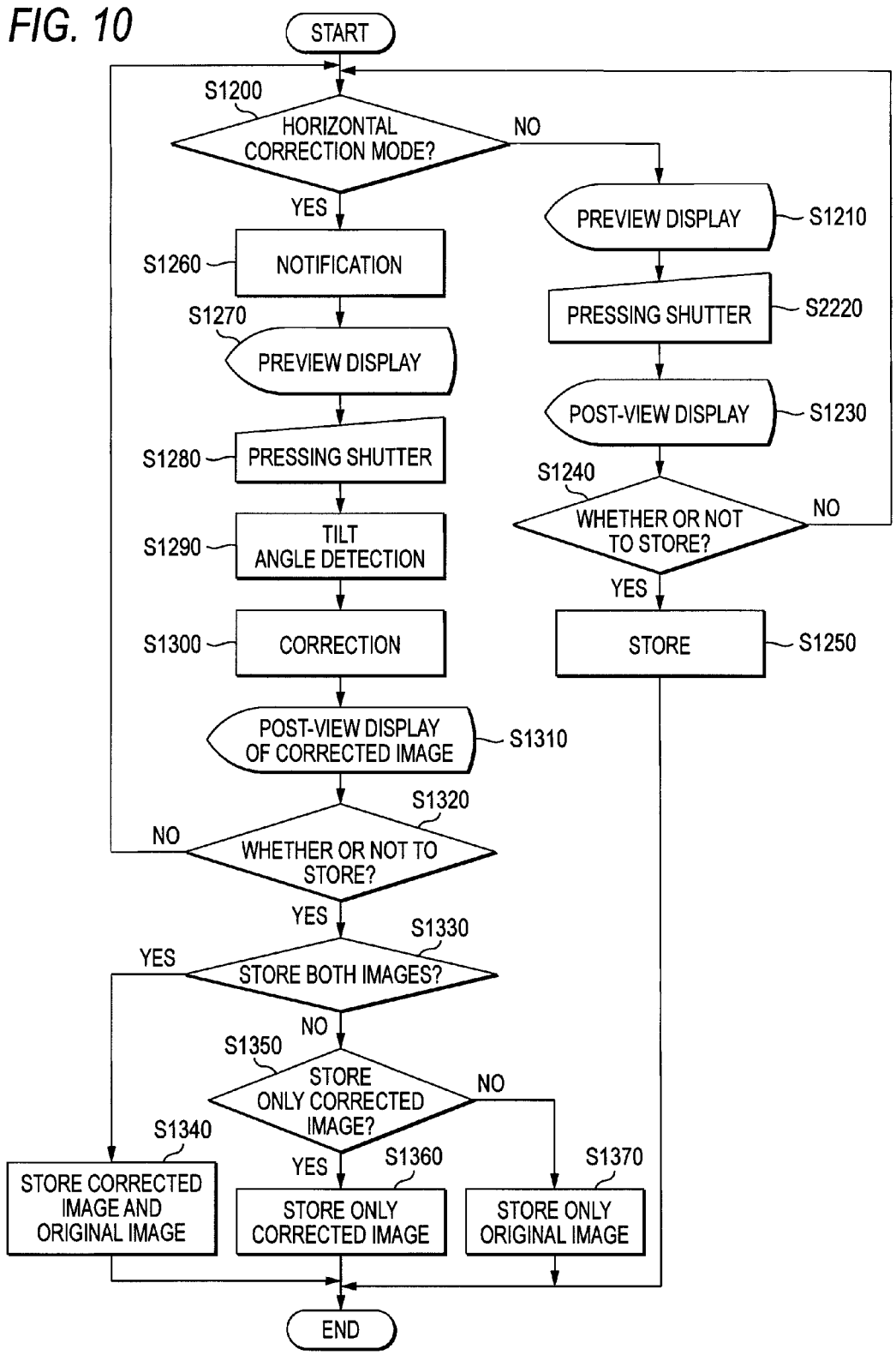
Figure 11:
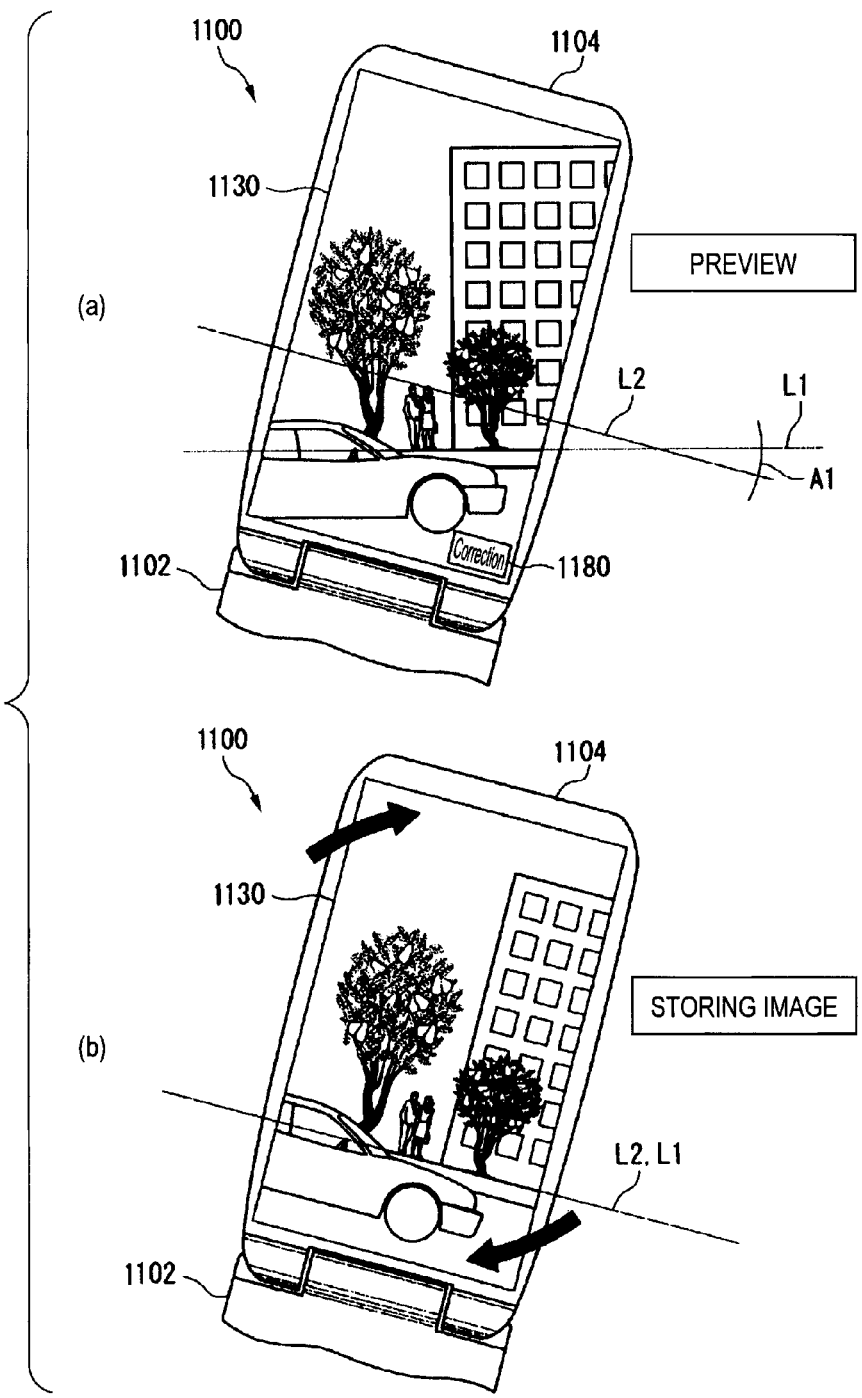
Figure 12:
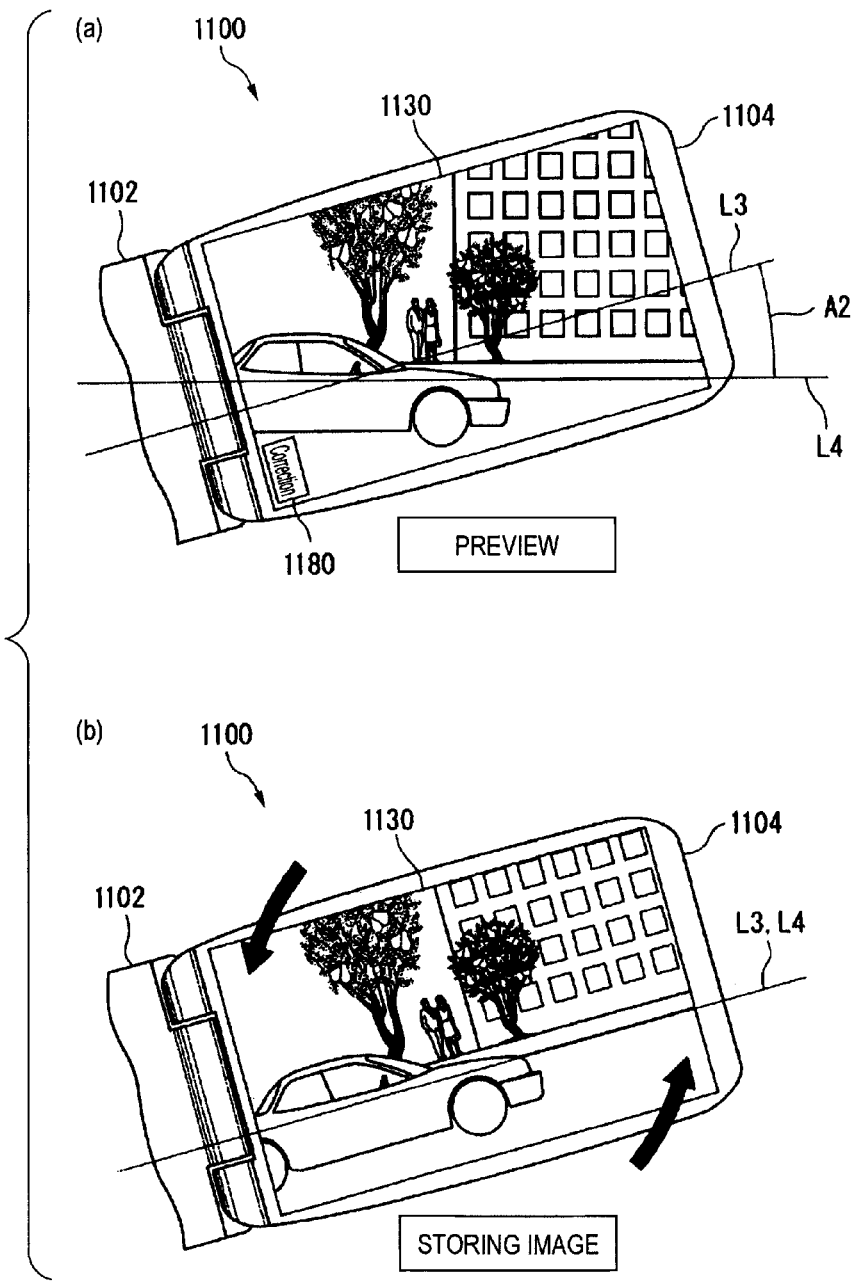
Figure 13:
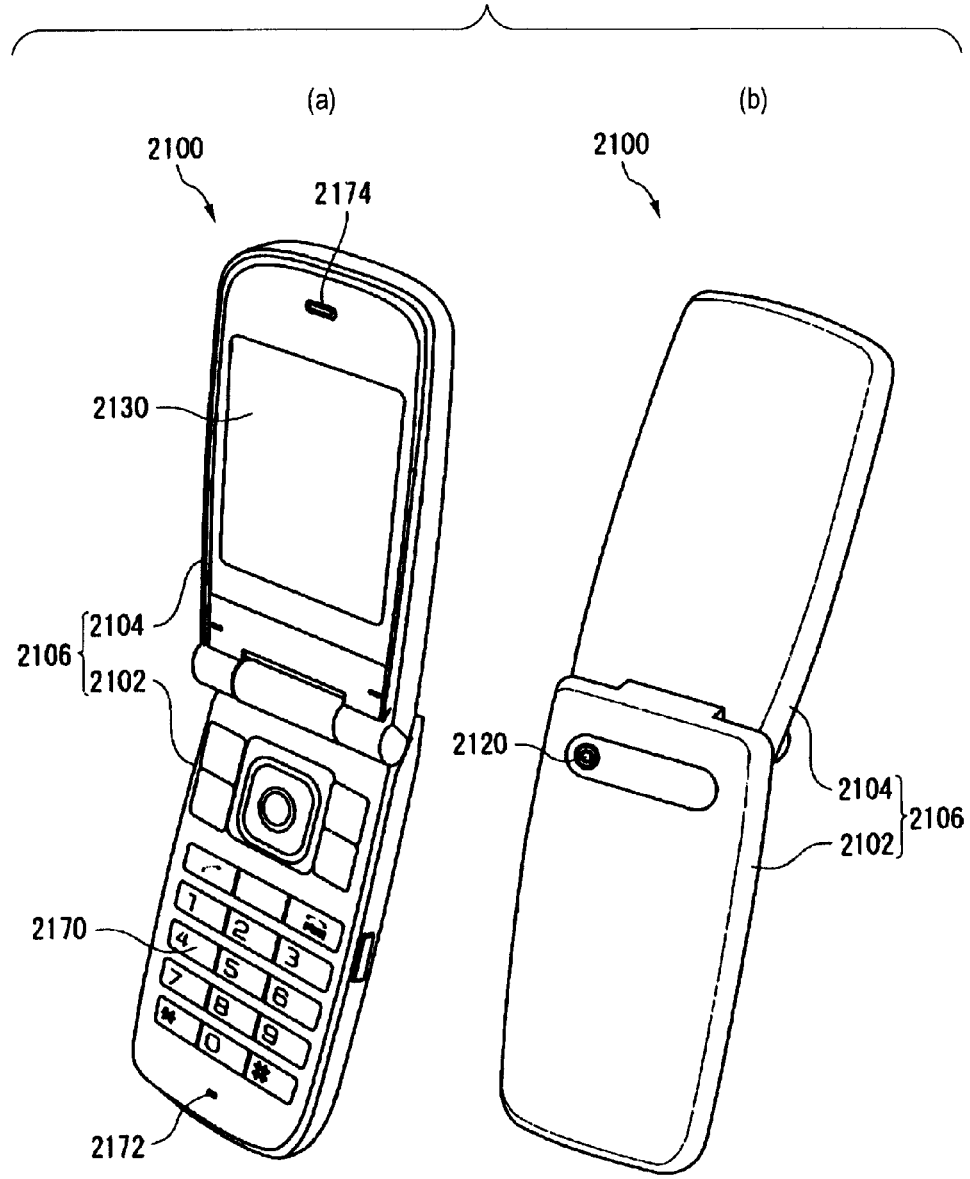
Figure 14:
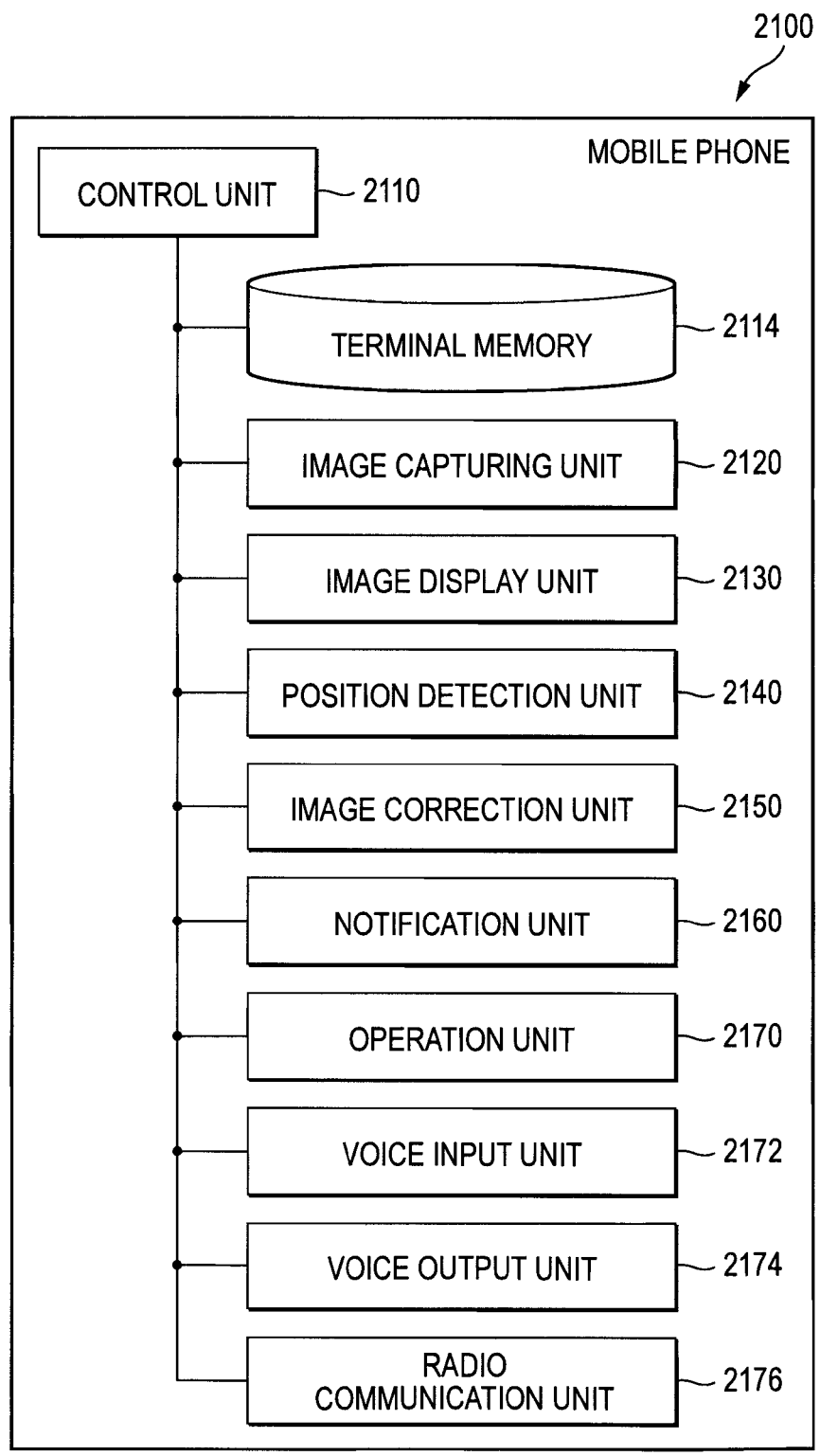
Figure 15:
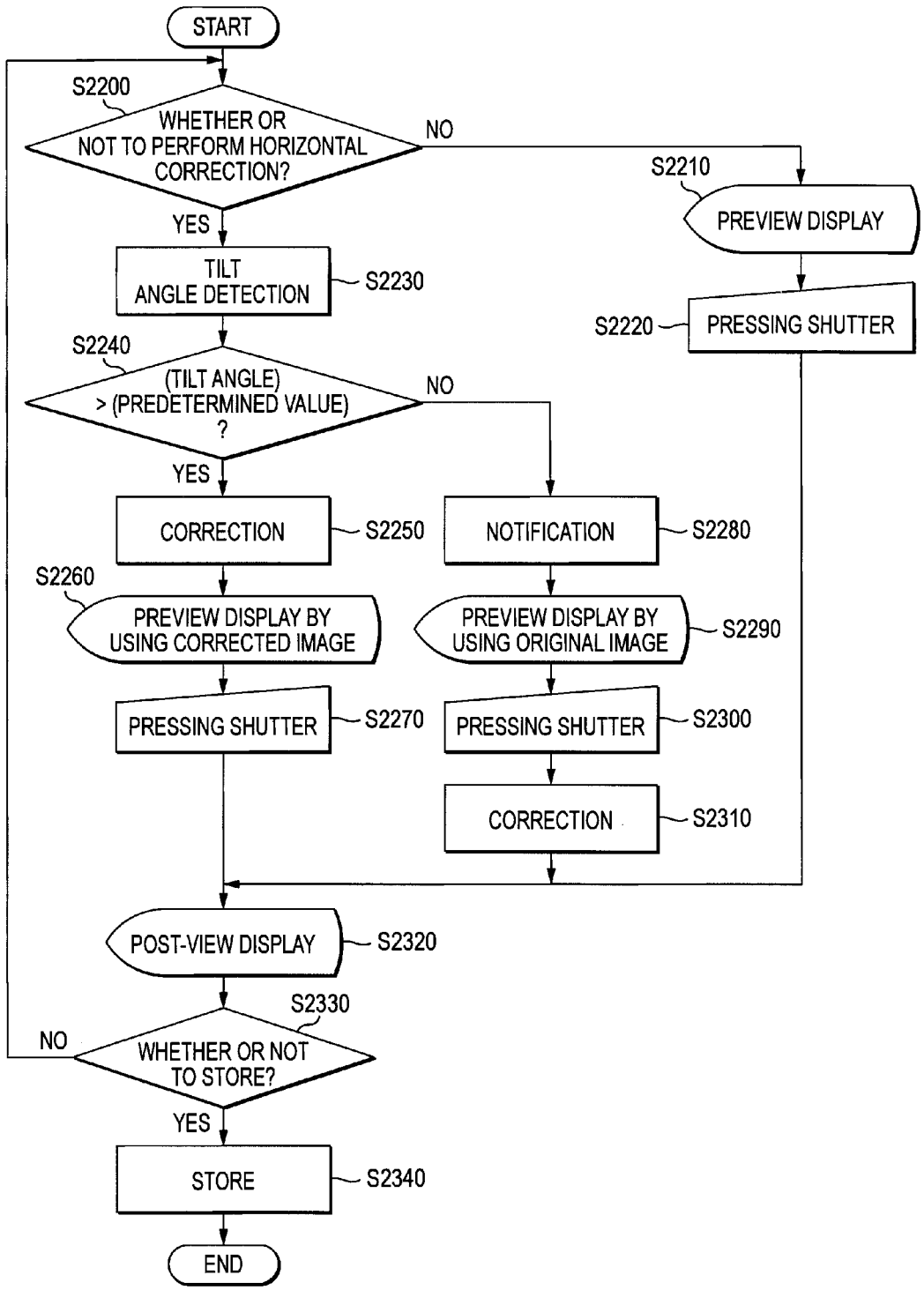
Figure 16:
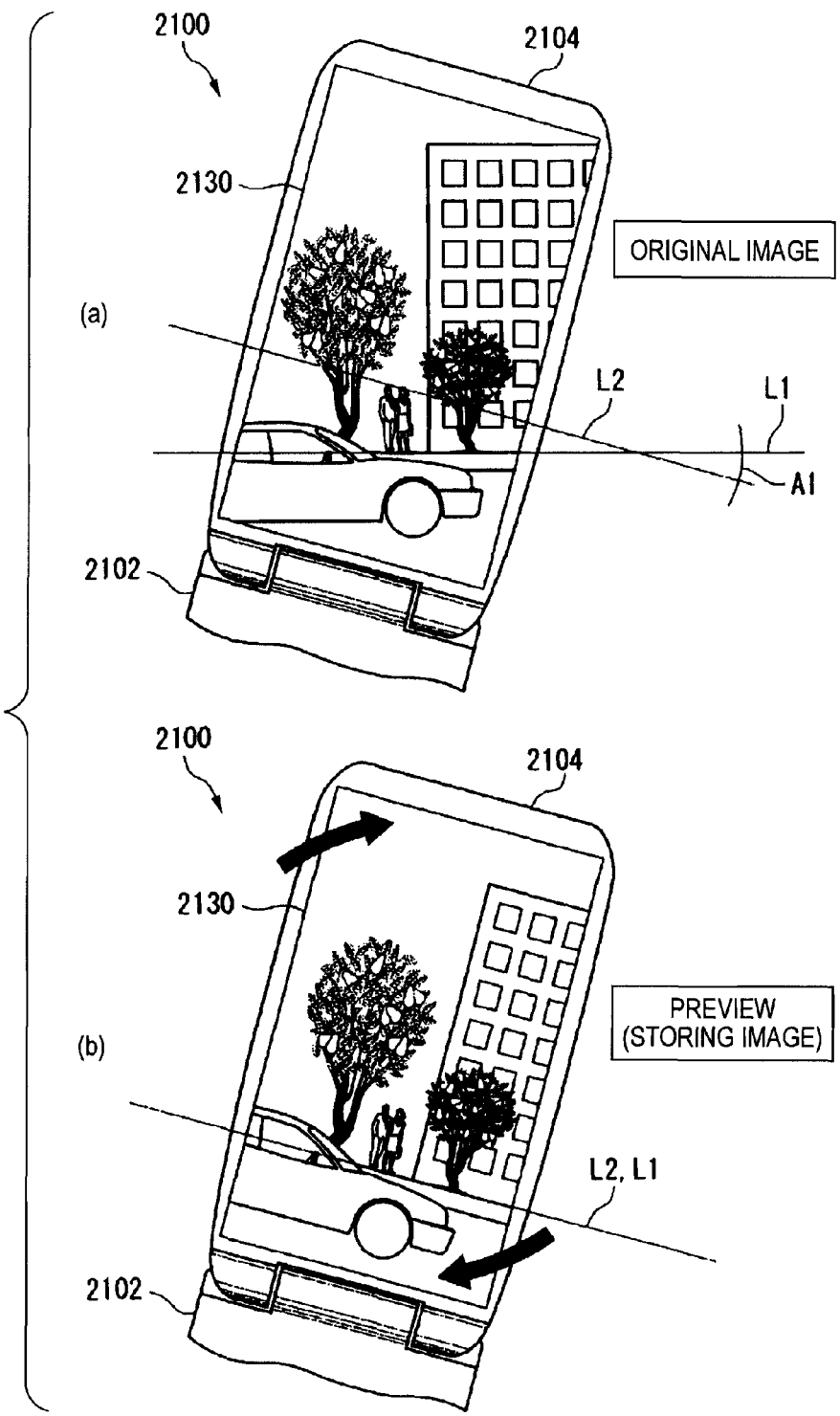
Figure 17:
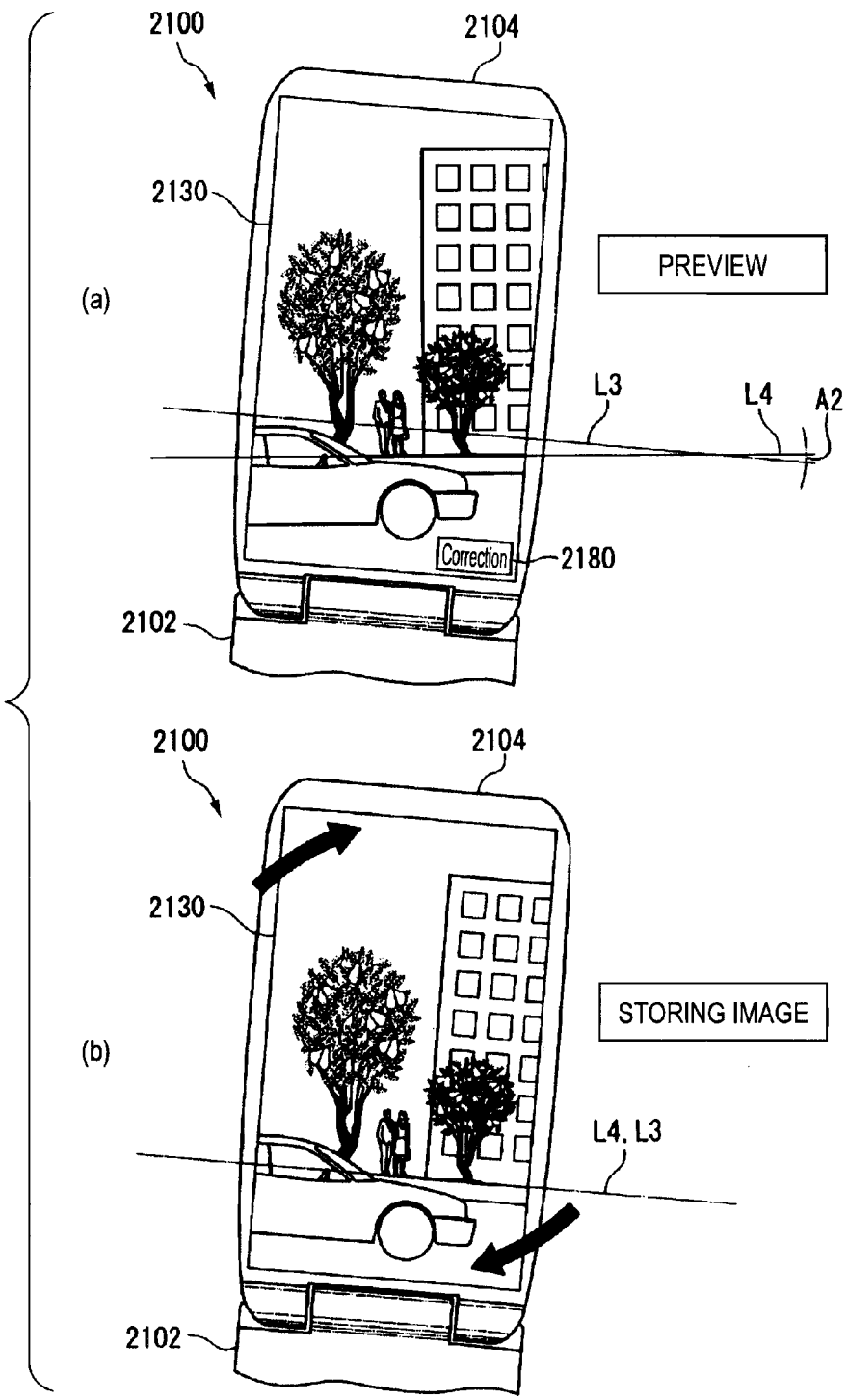
Figure 18:
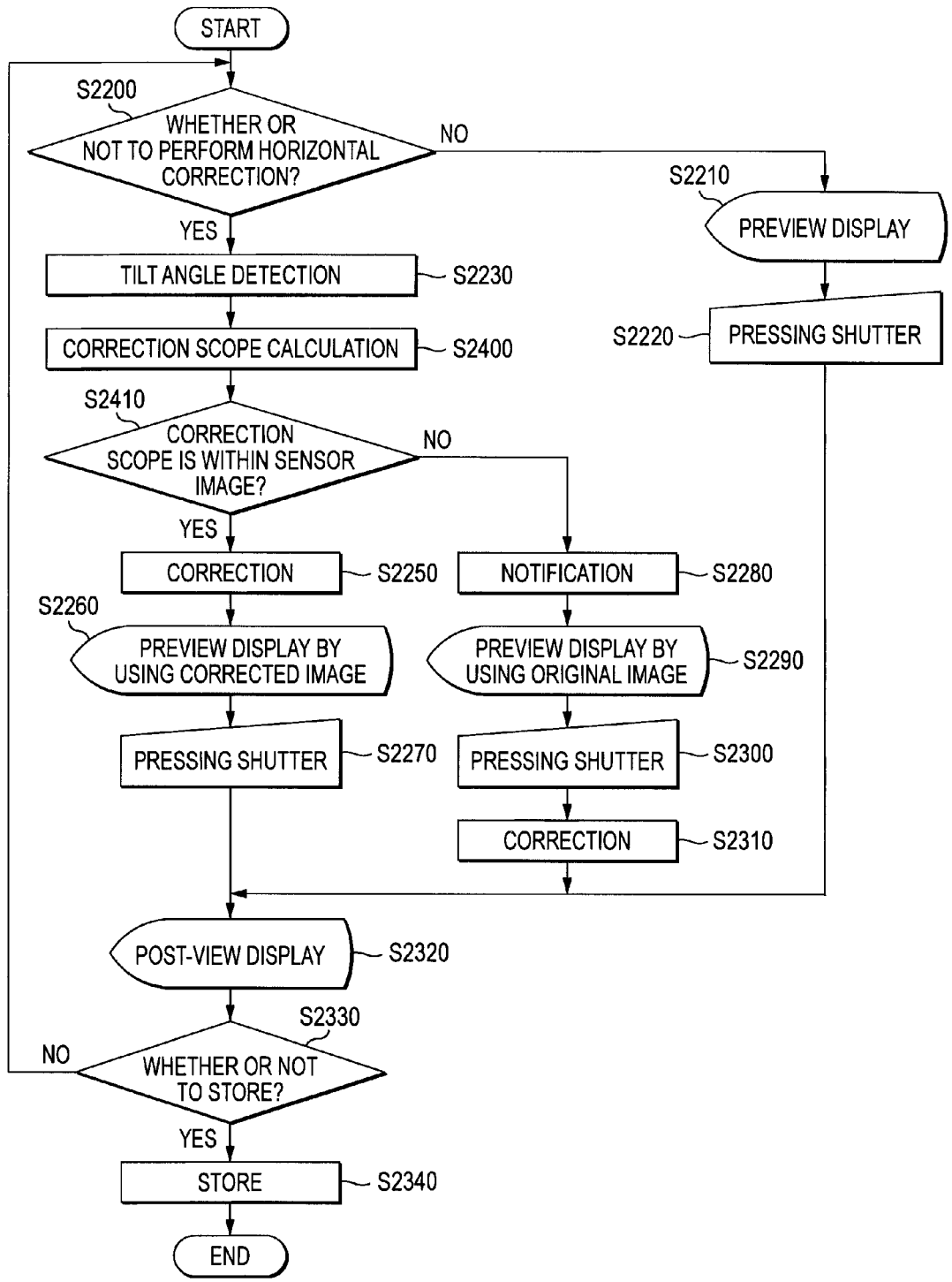
Figure 19:
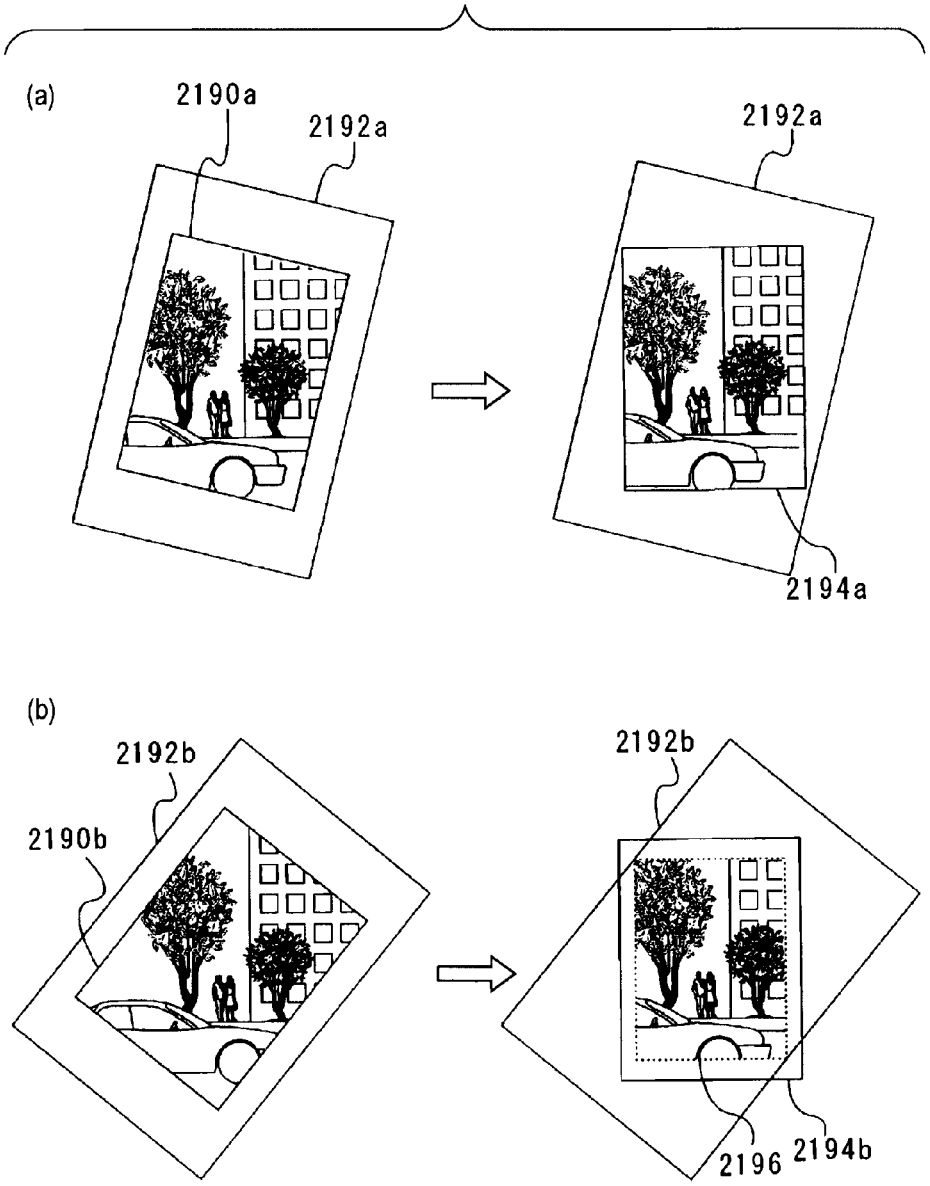

FIG. 1 It is an appearance view of a mobile phone in Embodiment 1 of the present invention.
FIG. 2 It is a general functional block diagram of the mobile phone.
FIG. 3 It is a flowchart for an explanation of image capturing operation.
FIG. 4 It is a view for an explanation of a live correction mode.
FIG. 5 It is a view for an explanation of a frame correction mode.
FIG. 6 It is a view for an explanation of Embodiment 2.
FIG. 7 It is a view for an explanation of Embodiment 2.
FIG. 8 It is an appearance view of a mobile phone in Embodiment 3.
FIG. 9 It is a general functional block diagram of the mobile phone.
FIG. 10 It is a flowchart for an explanation of image capturing operation.
FIG. 11 It is a view for an explanation of a horizontal correction mode.
FIG. 12 It is a view for an explanation of a horizontal correction mode.
FIG. 13 It is an appearance view of a mobile phone in Embodiment 4.
FIG. 14 It is a general functional block diagram of the mobile phone.
FIG. 15 It is a flowchart for an explanation of image capturing operation in Embodiment 4.
FIG. 16 It is a view for an explanation of a first correction mode.
FIG. 17 It is a view for an explanation of a second correction mode.
FIG. 18 It is a flowchart for an explanation of image capturing operation in Embodiment 5.
FIG. 19 It is a view for an explanation of a correction scope.

DESCRIPTIONS OF REFERENCE NUMERALS

100 . . . mobile phone, 102 . . . first housing, 104 . . . second housing, 106 . . . housing, 110 . . . control unit, 114 . . . terminal memory, 120 . . . image capturing unit, 130 . . . image display unit, 140 . . . position detection unit, 150 . . . image correction unit, 160 . . . face recognition unit, 170 . . . operation unit, 172 . . . voice input unit, 174 . . . voice output unit, 176 . . . radio communication unit, 180 . . . image acquisition box, 190 . . . focus point, 1100 . . . mobile phone, 1102 . . . first housing, 1104 . . . second housing, 1106 . . . housing, 1110 . . . control unit, 1114 . . . terminal memory, 1116 . . . image recording unit, 1120 . . . image capturing unit, 1130 . . . image display unit, 1140 . . . position detection unit, 1150 . . . image correction unit, 1160 . . . notification unit, 1170 . . . operation unit, 1172 . . . voice input unit, 1174 . . . voice output unit, 1176 . . . radio communication unit, 1180 . . . icon, 2100 . . . mobile phone, 2102 . . . first housing, 2104 . . . second housing, 2106 . . . housing, 2110 . . . control unit, 2114 . . . terminal memory, 2120 . . . image capturing unit, 2130 . . . image display unit, 2140 . . . position detection unit, 2150 . . . image correction unit, 2160 . . . notification unit, 2170 . . . operation unit, 2172 . . . voice input unit, 2174 . . . voice output unit, 2176 . . . radio communication unit, 2180 . . . icon, 2190a, 2190b . . . scope of an original image, 2192a, 2192b . . . sensor image, 2194a, 2194b . . . rotation correction scope, 2196 . . . broken line box (corrected image)

BEST MODE FOR CARRYING OUT THE INVENTION

Embodiment 1

Hereinafter, Embodiment 1 of the present invention will be described in detail with reference to the accompanying drawings. In such an embodiment, dimensions, materials, and other particular numerical values, etc., are merely exemplary to facilitate understanding of the invention and should not be construed as limiting the present invention thereto unless otherwise expressly described herein. Meanwhile, in this specification and the drawings, components having substantially the same functions and configurations are denoted by the same reference numeral to omit repeated explanation, and components having no direct relation with the present invention are not illustrated.

The image capturing device of the present invention is a mobile terminal usually held by hands to perform a image capturing, such as an electronic camera (digital camera), a mobile phone, a PHS, a note-type personal computer, a PDA (Personal Digital Assistant), a music player, a car navigator, a PND (Personal Navigation Device), a game device, and a remote controller, which have an image capturing function. In Embodiment 1, a foldable mobile phone having an image capturing function will be described as an example of the image capturing device.

FIG. 1 is an appearance view of a mobile phone in Embodiment 1. FIG. 1(a) is a front view of a foldable mobile phone (hereinafter, simply referred to as a mobile phone 100) in the state that the housing is open. FIG. 1(b) is a rear view of the mobile phone 100 in the state that the housing is open. FIG. 2 is a general functional block diagram of the mobile phone 100.

As illustrated in FIG. 1, the mobile phone 100 includes a housing 106, an image capturing unit 120, an image display unit 130, an operation unit 170, a voice input unit 172, and a voice output unit 174. The housing 106 includes a first housing 102 and a second housing 104.

As illustrated in FIG. 2, the mobile phone 100 further internally includes a control unit 110, a terminal memory 114, a position detection unit 140, an image correction unit 150, a face recognition unit 160, and a ratio communication unit 176.

The housing 106 configures the exterior of the mobile phone 100. The first housing 102 and the second housing 104 are connected to each other by hinges such that they have a foldable structure. Generally, the image capturing by the image capturing unit 120 is performed in the state that the first housing 102 and the second housing 104 are open. Specifically, a user performs image capturing by directing the image capturing unit 120 provided on the rear of the first housing 102 toward a target and using the image display unit 130 provided on the second housing 104, instead of a finder.

The control unit 110 manages and controls the mobile phone 100 as a whole by a semiconductor integrated circuit including a central processing unit (CPU). For example, it is capable of performing applications for a call function, a character inputting function, a music playing function, a TV viewing function or others, and applications for a web browser provided from an application relay server (not illustrated) through a communication network, a schedule management or others.

The terminal memory 114 is configured by a ROM, a RAM, a EEPROM, a non-volatile RAM, a flash memory, a HDD, and so on, and stores programs and voice data, etc., processed by the control unit 110. For example, it is capable of storing an image captured by the image capturing unit 120.

The image capturing unit 120 is a camera unit as hardware, and includes a lens or a light receiving element (CCD, CMOS, or others). A user operates the operation unit 170 to capture the image of the target. The image capturing unit 120 may capture an image under control by the control unit 110. For example, the control unit 110 may control a shutter speed, auto focus, automatic exposure, automatic white balance, and others of the image capturing unit 120.

The image display unit 130 is provided in the second housing 104 and configured by a liquid crystal display, an EL (Electro Luminescence) display, or others, which is capable of displaying an image or a setting state. With this configuration, the image display unit 130 is capable of displaying phone numbers of an outgoing/incoming intended party, operation screens of various applications, videos, web contents, and others. The image display unit 130 is a finder of the image capturing unit 120 and is capable of performing a preview display before a shutter is pressed, or post-view display after the shutter is pressed.

The position detection unit 140 detects a position of the housing 106. For example, a position of the housing 106 is detected by using a 3-axis acceleration sensor as the position detection unit 140 so that a tilt angle of the mobile phone 100 to a horizontal or vertical direction can be detected. In the mobile phone 100 of Embodiment 1, since the image capturing unit 120 is provided in the first housing 102, detecting a tilt angle of the first housing 102 is effective for correction of an image, which will be described hereafter.

The image correction unit 150 corrects an image captured by the image capturing unit 120. The correction can be performed based on a position detected by the position detection unit 140. For example, a corrected image can be generated by: rotating an original image from data of an image acquired from the image capturing unit 120 based on a tilt angle of the mobile phone 100 detected by the position detection unit 140; cutting the rotated image to have the same length and width ratio as the image display unit 130; and enlarging the cut image to fit in the size of the image display unit 130.

As described in detail hereafter, when displaying a preview image before the shutter is pressed, the control unit 110 is capable of displaying a corrected image, which has been horizontally-corrected by the image correction unit 150, on the image display unit 130 as the preview image (hereinafter, referred to as a "live correction mode"). In stead of the live correction mode, the control unit 110 is capable of displaying an image acquisition box 180 indicating a scope of an image to be horizontally-corrected by the image correction unit 150 after the shutter is pressed, by overlapping with a normal preview image before the shutter is pressed (hereinafter, referred to as a "frame correction mode").

The face recognition unit 160 recognizes the face of a person included in an image captured by the image capturing unit 120. For example, the face of a person recognized by the face recognition unit 160 becomes an object of the auto focus by the control unit 110, such that an image of a person, at which a focus point has been automatically adjusted, can be captured. The face of the person can be recognized based on characteristic arrangement of eyes, nose, mouth, and others presented in the image. Since such recognition can be accomplished by known techniques, detailed descriptions thereof are omitted herein.

The operation unit 170 is configured by a movable switch such as a keyboard, a cross key, and a joystick and capable of accepting user's operation input. For example, a user uses the operation unit 170 to accomplish capturing an image of a target by the image capturing unit 120.

The voice input unit 172 is configured by a voice recognition means such as a microphone, and converts user's voice input during call into an electric signal, which can be processed in the mobile phone 100.

The voice output unit 174 is configured by a speaker and converts intended party's voice signal received in the mobile phone 100 into the voice to output. The voice output unit 174 may output ring tones, operation sounds of the operation unit 170, and an alarm sound, etc.

The radio communication unit 176 establishes radio communications with a base station by using a radio communication system such as CDMA or WiMAX (Worldwide Interoperability for Microwave Access), and performs voice communications with the intended party or data communications with the web server.

An operation of the mobile phone 100 having the foregoing configuration will be described. FIG. 3 is a flowchart for an explanation of image capturing operation. FIG. 4 is a view for an explanation of the live correction mode. FIG. 5 is a view for an explanation of the frame correction mode.

First, in S200, a user selects whether or not to perform a horizontal correction when activating the image capturing unit 120. If the horizontal correction is not performed (N in S200), a normal image capturing mode is adopted, and a preview display using an original image acquired from the image capturing unit 120 is started (S210).

If the horizontal correction is performed (Y in S200), a user further selects one of the live correction mode and the frame correction mode (S230). Incidentally, the mobile phone 100 may have a function for only one of the live correction mode and the frame correction mode, or be configured to select one of the modes based on setting by the user.

The live correction mode will be described with reference to FIGS. 3 and 4. FIG. 4(*a*) shows the preview display (S210) in a normal image capturing mode. If the shutter is pressed in the state that the mobile phone 100 is titled (S220), an image to be acquired is to be the tilted image, in which the horizontal direction is tilted. However, it is not easy for a user of the mobile phone 100 to keep manually the mobile phone 100 in the horizontal position while seeing the preview display.

If the live correction mode is selected (Y in S230), the position detection unit 140 detects a tilt angle A1 between a left-right direction L2 of the mobile phone 100 and a horizontal direction L1 (S240). As illustrated in FIG. 4(*b*), based on the tilt angle A1, the image correction unit 150 performs a correction (the horizontal correction) by rotating the original image in an arrow direction to fit the horizontal direction L1 of the original image to the left-right direction L2 of the mobile phone 100 (S250). The control unit 110 displays the corrected image for preview on the image display unit 130 (S260).

As illustrated in FIG. 4(*b*), in the live correction mode, an image after correction is displayed as a preview image. A user presses the shutter (S300) as is, the horizontally-corrected image can be acquired as a storing image.

Additionally, when the original image is rotated, blanks are formed in corner portions, because the image is rectangular. Accordingly, the rotated image is cut such that the scope of the rotated rectangle to fit the scope of the original image. In other words, the described correction includes two processes, i.e., rotating and cutting. The entire cut image is to be displayed on the entire space of the image display unit 130. However, the cut image may be extended to have the same size (the number of pixels) as the original image, or simply enlarged and displayed with keeping the small number of pixels of the cut image.

The corrected image that has been acquired is displayed on the image display unit 130 as a post-view image (S330). While the post-view is displaying (S330), it is possible to select whether or not to store the displayed image (S340). If the image is not stored (N in S340), it is transited to the image capturing operation in S200 and the following steps again. If the image is stored (Y in S340), the image is stored in the terminal memory 114 (S350), and the image capturing operation is finished.

According to the live correction mode, it is possible to perform image capturing operation while seeing compositions of the corrected image to be acquired as the preview image. Accordingly, it is possible to easily determine whether the corrected image is an intended image or not. In addition, it is possible for a user to acquire the horizontal image by simple processing without adjusting an angle of the mobile phone 100 by oneself.

The frame correction mode will be described with reference to FIGS. 3 and 5. If the frame correction mode is selected (N in S230), the position detection unit 140 detects the tilt angle A1 (refer to FIG. 4(*a*)) of the mobile phone 100 (S270). Based on the tilt angle A1 and the length and width ratio of the image display unit 130, the control unit 110 calculates a scope of the image to be corrected by the image correction unit 150 (S280). In this case, the image has not yet been corrected. The correction itself is the same process as the live correction mode, and the scope of the image to be corrected is an exterior edge (boundary) upon cutting.

As illustrated in FIG. 5(*a*), in the frame correction mode, it is indicated as the image acquisition box 180 that the scope of the image to be corrected is displayed, by overlapping with a normal preview image (S290). The image acquisition box 180 is a rectangle having sides parallel with the vertical direction, and has the same length and width ratio as the original image. Based on the position detected by the position detection unit 140, the control unit 110 enlarges or reduces the image acquisition box 180 to fit into the image display unit 130.

As illustrated in FIG. 5(*b*), even in the case where the mobile phone 100 is further tilted, the control unit 110 rotates the image acquisition box 180 based on the tilt angle A1 detected by the position detection unit 140, so that the image acquisition box 180 can be kept in the vertical position. In this case, the control unit 130 also enlarges or reduces the image acquisition box 180 to fit into the image display unit 130.

In the frame correction mode, when the shutter is pressed (S310) after the preview display (S290), the correction to the original image is actually performed based on the image acquisition box 180 (S320). As illustrated in FIGS. 5(*a*) and 5(*b*), the corrected image that has been acquired is displayed on the image display unit 130 as a post-view image (S330). In this case, the image display unit 130 displays the image after the correction. Likewise, it is inquired whether or not to store the corrected image (S340). In accordance with operation, the corrected image is stored into the terminal memory 114 (S350). Because of the correction, the original image becomes the horizontally-corrected image.

According to the frame correction mode, since the image acquisition box 180 is displayed by overlapping with a normal preview image, it is possible to perform image capturing while seeing and comparing the scope of the image acquired in a normal image capturing mode and the scope of the image acquired in the frame correction mode. Accordingly, a user can easily determine whether the image that has been corrected and acquired is an intended image or not. In addition, the user can acquire the horizontal image by the simple processing without adjusting an angle of the mobile phone 100.

As described above, with the configuration of Embodiment 1, the horizontal correcting to a captured image can be automatically performed. Accordingly, the user does not need to hold the mobile phone 100 with concerning the horizontality, so that the user can easily capture the image of the target at the proper angle.

Embodiment 2

Embodiment 2 that corrects by the image correction unit 150 will be described with reference to FIGS. 6 and 7. The same elements as Embodiment 1 will be denoted by the same reference numerals as used in Embodiment 1, and explanations thereof will be omitted.

In Embodiment 1, it is described based on an assumption that rotating and correcting is performed with respect to the center of the original image. However, there is a case where an intended object to be captured may be closed toward an edge of an image due to the rotation. In extreme case, the object is to be out of the image. In order to obtain a more proper image, the center of rotation needs to be considered.

FIG. 6 is an example for performing the correction by rotating the original image based on a focus point. In FIG. 6, a focus point 190 is present on the soccer ball. The correction is performed by rotating the original image with respect to the soccer ball. The focus point 190 is considered as a subject in the image (picture). The original image is rotated based on the focus point 190, such that the image at the position can be prevented from being closed toward the edge of the image. Accordingly, a user can easily capture an image of a target without concerning adjustment of compositions of the target.

In most snap photos, a person is a subject. Accordingly, recognizing the face of a person and setting the focus point 190 at the position have been usually performed.

As illustrated in FIG. 7(*a*), the image correction unit 150 is also capable of performing the correction based on the face of a person recognized by the face recognition unit 160. In this case, it is preferable to set the focus point 190 at the face of the person. Accordingly, it is possible to prevent the face of the person from being closed toward the edge of the image due to the correction. Even when capturing an image of a person, a user can easily acquire a corrected image, in which a direction of the target has been properly corrected, without concerning adjustment of compositions.

As illustrated in FIG. 7(*b*), if the face recognition unit 160 recognizes the faces of a plurality of persons at the same time, the image correction unit 150 may perform the correction by rotating the original image with respect to a center point of the faces of the plurality of persons. Accordingly, even in the case where a plurality of persons is targets, the correction can be performed in the state that all the persons are presented in the image. In this case, the focus point 190 may be set at any of the faces of the persons.

In both the correction modes, the control unit 110 is capable of performing automatic exposure (AE) and automatic white balance (AWE) based on an image within a scope corrected by the image correction unit 150. Specifically, if the sky is present within the scope of the original image and is not present within the scope of the corrected image, brightness or color of the sky may be omitted to obtain proper exposure, and level conversion of each color component of R, G, and B may be performed. Since the color state can be corrected within the scope of the image to be actually acquired after the correction, it is possible to acquire an image, in which color of a target is more properly expressed.

Embodiment 1 and Embodiment 2 has described the state that the mobile phone 100 is held vertically as the same position as the calling. In Embodiment 1 and Embodiment 2, however, it is possible to perform the correction even in the state that the mobile phone 100 is held horizontally. For example, in the live correction mode, the position detection unit 140 detects a tilt angle of the mobile phone 100 to the vertical direction. When the vertically elongated image display unit 130 is tilted at more than 45 degrees to the vertical direction and is to be in the horizontally state, the display of a preview image is also changed into a horizontally elongated state so that the horizontal correction can be performed. In the frame correction mode, when the image display unit 130 is tilted at more than 45 degrees to the vertical direction, the image acquisition box 180 is also changed into the horizontally elongated state and displayed.

The image correction unit 150 may be capable of correcting an image so that the image has an angle set voluntarily by a user, not only the horizontal correction described in Embodiments. Accordingly, a user can easily and surely perform an intended expression on the image by setting an angle such as 15 degrees or 30 degrees to the horizontal direction. The image correction unit 150 may perform a perspective correction to an image based on the position detected by the position detection unit 140, so that it is possible to acquire a corrected image, in which a distortion of a perspective direction of the original image is corrected.

Embodiment 3

Embodiment 3 of the present invention will be described in detail with reference to the drawings. Each element will be denoted by a reference numeral in the 1000s. However, explanation of elements, which have the same functions as Embodiments 1 and 2, will be omitted. Hereinafter, differences between Embodiment 3 and Embodiments 1 and 2 will be described.

As illustrated in FIG. 9, the mobile phone 1110 further internally includes an image recording unit 1116.

The terminal memory 1114 is configured by a ROM, RAM, EEPROM, non-volatile RAM, flash memory, HDD, and so on, and stores programs and voice data, etc., processed in the control unit 1110. The image recording unit 1116 is provided in the terminal memory 1114 and is capable of storing an image captured by the image capturing unit 1120.

The notification unit 1160 notifies that the correction to the original image by the image correction unit 1150 is to be performed, in a predetermined manner. The predetermined manner may be display of an icon or a predetermined character on the image display unit 1130. Instead of the notification using the image display unit 1130, the notification may be performed by light emission of LED that has been provided in the mobile phone 1100, or a lighting of a light of a key pad included in the operation unit 1170. The notification may be performed by a single manner or a combination of a plurality of manners.

An operation of the mobile phone 1100 having the foregoing configuration will be described. FIG. 10 is a flowchart for an explanation of an image capturing operation. FIGS. 11 and 12 are views for an explanation of a horizontal correction mode.

First, in S1200, the control unit 1110 inquires of a user whether or not image capturing is performed in the horizontal correction mode when the image capturing unit 1120 is activated. If the horizontal correction mode is not selected (N in S1200), a normal image capturing mode is adopted, and a preview display using directly the original image acquired from the image capturing unit 1120 is started (S1210).

When the shutter is pressed (S1220) after the preview display (S1210), the control unit 1110 acquires the image at that time as a storing image, and displays the storing image for post-view (S1230). In the post-view display (S1230), the control unit 1110 inquires of a user whether or not to store the displayed image (S1240). If the storing is canceled (N in S1240), the image capturing operation in S1200 and the following steps is performed again. If the storing is selected (Y in S1240), the image is stored into the image recording unit 1116 (S1250), and the image capturing operation is finished.

However, in the case where the mobile phone 1100 is tilted, if the shutter is pressed in that state, the image that has been acquired is to be a tilted image, in which the horizontal direction is tilted. However, since the mobile phone 1100 is held and used by hands, it is not easy for a user to keep manually the mobile phone 1100 in the horizontal position while seeing the preview display. Accordingly, in the horizontal correction mode of Embodiment 3, the operation is performed as described hereinafter.

In S1200, if the horizontal correction mode is selected (Y in S1200), the horizontal correction mode (horizontal correction to be performed) is first notified by the notification unit 1160 in a predetermined manner (S1260). The control unit 1110 starts the preview display using directly the original image acquired from the image capturing unit 1120 with the notification (S1270).

As illustrated in FIG. 11(*a*), the predetermined manner may be a display of an icon 1180 on the image display unit 1130. Although it is not illustrated herein, the notification may be performed by displaying a predetermined character around an edge of the image display unit 1130 to not disturb the preview display. Instead of the notification using the image display unit 1130, the notification may be performed by light emission of LED that has been provided in the mobile phone 1100, or lighting of a light of a key pad included in the operation unit 1170. Accordingly, a user can capture an image with considering that horizontal correction to the original image is to be performed.

The notification by the notification unit 1160 may be performed by a single manner or a combination of a plurality of manners. If the notification is unnecessary, it is possible to set to not perform the notification.

In the horizontal correction mode, when the shutter is pressed (S1280) after the preview display (S1270), the control unit 1110 acquires the image at that time as an original image. In this case, as illustrated in FIG. 11(*a*), the position detection unit 1140 detects the tilt angle A1 between the left-right direction L2 of the mobile phone 1100 and the horizontal direction L1 (S1290).

As illustrated in FIG. 11(*b*), based on the tilt angle A1, the image correction unit 1150 performs the correction (horizontal correction) by rotating the original image in an arrow direction to fit the horizontal direction L1 of the original image to the left-right direction L2 (S1300). In S1310, the control unit 1110 displays the corrected image as a post-view image. A user can acquire the horizontally-corrected image as a storing image (S1320) by only pressing the shutter (S1280).

According to the horizontal correction mode, a user can capture an image while seeing the preview display and concentrating on adjustment of a focus point to a target, without manually adjusting an angle of the mobile phone 1100.

FIG. 11 shows the state that the mobile phone 1100 is held vertically as the same position as the calling. However, as illustrated in FIG. 12, in the horizontal correction mode, the correction may be performed in the manner that the display of the length and the width of the corrected image on the image display unit 1130 are switched by the control unit 1110.

The switching of the length and width display may be performed based on a tilt angle of the mobile phone 1100 to a predetermined direction by the position detection unit 1140. For example, if the mobile phone 1100 in the vertically elongated state is tiled at more than 45 degrees to the vertical direction as illustrated in FIG. 11, the mobile phone 1100 can be switched into the horizontally elongated state as illustrated in FIG. 12.

In the horizontal correction in the horizontally elongated state of FIG. 12, when the shutter is pressed (S1280), the position detection unit 1140 detects the tilt angle A2 between the left-right direction L3 of the mobile phone 1100 and a horizontal direction L4 (S1290) (FIG. 12(*a*)). Based on the tilt angle A2, the image correction unit 1150 performs a horizontal correction by rotating the original image in an arrow direction to fit the horizontal direction L4 of the original image to the left-right direction L3 of the mobile phone 1100 (S1300) (FIG. 12(*b*)).

As described above, even if the left-right direction of the mobile phone 1100 is changed in response to the changes of an angle, in which the mobile phone 1100 is held, the proper horizontal correction can be performed by the control unit 1110. Accordingly, a user can acquire a horizontal image in accordance with situations by simple processing.

Meanwhile, in the horizontal correction illustrated in FIGS. 11 and 12, when the image is rotated, blanks are formed in corner portions of the image display unit 1130, because the image is rectangular. Accordingly, the rotated image is cut so that the scope of the rotated rectangle to fit the scope of the original image. In other words, the described correction includes two processes, i.e., rotating and cutting. The entire cut image is to be displayed on the entire space of the image display unit 1130. However, the cut image may be extended to have the same size (the number of pixels) as that of the original image, or simply enlarged and displayed with keeping the small number of pixels of the cut image.

The corrected image, which has been horizontally-corrected by the image display unit 1150, is displayed by the control unit 1110 on the image display unit 1130 as a post-view image (S1310). Upon the post-view display (S1310) in the horizontal correction mode, the control unit 1110 inquires of a user whether or not to store the displayed image (S1320).

As described above, since the corrected image is generated by rotating and cutting of the original image, there is difference in compositions between the original image identified in the preview display and the corrected image that has been corrected and acquired. Accordingly, the corrected image may have composition, which is not intended by a user. However, when an image of a moving target is captured, there is no same chance to press the shutter again. Accordingly, there may be a case where recapturing is impossible.

Accordingly, the image correction unit 1150 generates the corrected image from copy data of the original image, and keeps original data of the original image, so that the corrected image and the original image can be compared by post-view display. For the post-view display (S1310), the corrected image and the original image may be switched and displayed in response to the operation of the operation unit 1170, or reduced and displayed at the same time.

In Embodiment 3, if the images are stored (Y in S1320), the control unit 1110 inquiries of a user whether or not to store both the corrected image and the original image (S1330). If storing both the images is selected (Y in S1330), the control unit 1110 stores both the corrected image and the original image into the image recording unit 1116 (S1340), and the image capturing operation is finished. If storing one of the images is selected (N in S1330), the control unit 1110 further inquiries whether or not to store only the corrected image (S1350). If storing only the corrected image is selected (Y in S1350), the control unit 1110 stores only the corrected image into the image recording unit 1116 (S1360), and the image capturing operation is finished. If not storing the corrected image is selected (N in S1350), the control unit 1110 stores only the original image into the image recording unit 1116 (S1370), and the image capturing operation is finished.

According to the horizontal correction mode, it is possible to store the original image that has not been corrected, not only the horizontally-corrected image. Accordingly, when using the images for different purposes, and even if the images are intended to the same target, a user can select and use the corrected image and the image that has not been corrected in accordance with user's preference.

As described above, according to the configuration of Embodiment 3, it is possible to automatically perform the horizontal correction to the captured image. Accordingly, a user does not need to hold the mobile phone 1100 with concerning the horizontality, so that user can easily capture an image of the target at the proper angle.

The image correction unit 1150 may be capable of correcting an image so that an image has an angle set voluntarily by a user, not only the horizontal correction described in Embodiments Accordingly, a user can perform a intended expression on the image. The image correction unit 1150 may perform perspective correction to an image based on the position detected by the position detection unit 1140, so that it is possible to acquire a corrected image, in which a distortion of a perspective direction of an original image is corrected.

Embodiment 4

Embodiment 4 of the present invention will be described in detail with reference to the drawings. Each element will be denoted by a reference numeral in the 2000s. Explanations of the elements, which have the same functions as Embodiments 1 to 3, will be omitted. Hereinafter, differences between Embodiment 4 and Embodiments 1 to 3 will be described.

As illustrated in FIG. 14, the mobile phone 2100 further internally includes a notification unit 2160.

The notification unit 2160 notifies a correction to an original image by the image correction unit 2150 in a predetermined manner. The predetermined manner may be display of an icon or a predetermined character on the image display unit 2130. Instead of the notification using the image display unit 2130, the notification may be performed by light emission of LED that has been provided in the mobile phone 2100, or a lighting of a light of a key pad in the operation unit 2170. Meanwhile, the notification may be performed by a single manner or a combination of a plurality of manners.

An operation of the mobile phone 2100 having the foregoing configuration will be described. FIG. 15 is a flowchart for an explanation of an image capturing operation of Embodiment 4. FIG. 16 is a view for an explanation of a first correction mode. FIG. 17 is a view for an explanation of a second correction mode.

First, in S2200, the control unit 2110 inquiries of a user whether or not to perform the horizontal correction when activating the image capturing unit 2120. If the horizontal correction is not performed (N in S2200), a normal image capturing mode is performed, and a preview display using directly an original image acquired from the image capturing unit 2120 is started (S2210). When a user presses the shutter (S2220), the control unit 2110 performs a post-view display of the image at that time as a storing image (S2320) and inquiries of a user whether or not to store the image (S2330). If storing the image is selected (Y in S2330), the control unit 2110 records the image into the terminal memory 2114. If the storing is canceled (N in S2330), the operation is returned to S2200 and the image capturing is continued.

If performing a horizontal correction is selected (Y in S2200), the position detection unit 2140 detects a tilt angle of the mobile phone 2100 to a predetermined direction (S2230). For example, the predetermined direction may be a horizontal or vertical direction. The tilt angle may be an angle of the left-right direction of the mobile phone 2100 to the horizontal direction, or an angle of the upward-downward direction of the mobile phone 2100 to the vertical direction.

Next, the control unit 2110 determines whether or not the tilt angle is more than a predetermined value (S2240). The predetermined value may be an angle set with considering such as a size of the mobile phone 2100, a size of the image display unit 2130 or others, or an angle set voluntarily by a user, for example.

If it is determined that the tilt angle is more than the predetermined value, the control unit 2110 selects the first correction mode (Y in S2240). If it is determined, that the tilt angle is equal to or less than a predetermined value, the control unit 2110 selects the second correction mode (N in S2240).

The first correction mode will be described with reference to FIGS. 15 and 16. In descriptions of the first correction mode, as illustrated in FIG. 16(*a*), the tilt angle A1 is an angle between the left-right direction L2 of the mobile phone 2100 and the horizontal direction L1.

If the image capturing is performed in the state that the mobile phone 2100 is significantly tilted, the original image identified by the normal preview display and the corrected image that has been horizontally-corrected is significantly different in the compositions. Accordingly, the horizontally-corrected and acquired image may become an image having the compositions that is not intended by the user.

Accordingly, in the first correction mode, based on the tilt angle A1, the correction (horizontal correction) is performed by rotating the original image in an arrow direction to fit the horizontal direction L1 of the original image to the left-right direction L2 of the mobile phone 2100 (S2250) (FIG. 16(*b*)). Next, the control unit 2110 performs the preview display of the corrected image on the image display unit 2130 (S2260).

In other words, as illustrated in FIG. 16(*b*), in the first correction mode, the control unit 2110 displays the image after the correction as a preview image (S2260). Accordingly, a user can confirm the image that has been horizontally-corrected and acquired, at the stage prior to pressing the shutter.

When a user presses the shutter (S2270), the control unit 2110 can acquire the horizontally-corrected image as a storing image.

Additionally, when the image is rotated, blanks are formed in corner portions, because the image is rectangular. Accordingly, the rotated image is cut so that the scope of the rotated rectangle to fit the scope of the original image while maintaining the length and width ratio. In other words, the described correction includes two processes, i.e., rotating and cutting. The entire cut image is to be displayed on the entire space of the image display unit 2130. However, the cut image may be extended to have the same size (the number of pixels) as the original image, or simply enlarged and displayed in the state of the small number of pixels of the cut image.

The storing image that has been acquired is displayed on the image display unit 2130 as the post-view image (S2320). When displaying of the post-view (S2320), the control unit 2110 inquiries of a user whether or not to store the image (S2330). If not storing the image is selected (N in S2330), it is transited to the image capturing operation in S2200 and the following steps again. If storing the image is selected (Y in S2330), the control unit 2110 stores the stored image in the terminal memory 2114 (S2340), and the image capturing operation is finished.

According to the first correction mode, a user can perform image capturing operation while seeing the compositions of the corrected image to be acquired as the preview image, so that the user can easily determine whether or not the corrected image to be acquired is an intended image, prior to pressing the shutter. In addition, the user can simply and easily acquire the horizontal image without adjusting an angle of the mobile phone 2100.

The second correction mode will be described with reference to FIGS. 15 and 17. FIG. 17(a) is a view showing the preview display (S2290) in the second correction mode. FIG. 17(b) is a view showing a storing image. Additionally, in descriptions of the second correction mode, as illustrated in FIG. 16(a), the tilt angle A2 is an angle between the left-right direction L3 of the mobile phone 2100 and the horizontal direction L4.

In S2240, if the tilt angle A2 is smaller than the predetermined value (N in S2240), namely, the mobile phone 2100 is not significantly tilted, the differences of the compositions of the image by horizontal correction becomes small. In this case, the control unit 2110 selects the second correction mode.

In the second correction mode, the notification unit 2160 first notifies the correction is to be performed in a predetermined manner (S2280). With the notification, the control unit 2110 starts the preview display directly using the original image acquired from the image capturing unit 2120 (S2290).

As illustrated in FIG. 17(a) for example, a predetermined manner may be the display of the icon 2180 on the image display unit 2130. Although an illustration is omitted, the notification may be performed by displaying a predetermined character on the end of the image display unit 2130 to not disturb the preview display. Additionally, instead of the notification using the image display unit 2130, the notification may be performed by light emission of LED that has been provided in the mobile phone 2100, or lighting of a light of a key pad included in the operation unit 2170.

Incidentally, the notification by the notification unit 2160 may be performed by a single manner or a combination of a plurality of manners. If the notification is unnecessary, it is possible to set to not perform the notification.

In the second correction mode, when the shutter is pressed (S2300) after the preview display (S2260), the image correction unit 2150 actually performs the correction to the original image (S2310).

In S2310, based on the tilt angle A2, the image correction unit 2150 performs a horizontal correction by rotating the original image in an arrow direction to fit the horizontal direction L4 of the original image to the left-right direction L3 of the mobile phone 2100, and acquires the corrected image as a storing image (FIG. 17(b)).

The control unit 2110 performs a post-view display of the storing image that has been acquired on the image display unit 2130 (S2320). The control unit 2110 inquiries of a user whether or not to store the image (S2330) and stores the image in the terminal memory 2114 in response to an operation (S2340).

Accordingly, if the tilt of the mobile phone 2100 is small (tilt angle A2), differences in the compositions between the original image and the corrected image is small. Thus, the control unit 2110 selects the second correction mode and uses a normal preview image not using the corrected image, so that the preview display can be performed by more simple image processing than the first correction mode.

Additionally, the notification is performed with the preview display, so that a user can capture an image while considering that the horizontal correction to the original image is to be performed.

Incidentally, even after selecting the first or second correction mode, the control unit 2110 can switch the mode into the first or second correction mode in response to changing the tilt angle of the mobile phone 2100.

As described above, according to the configuration of Embodiment 4, it is possible to automatically perform the horizontal correction to the captured image and but also automatically select and perform the operation of the correction in accordance with situations. Accordingly, a user does not need to hold the mobile phone 2100 with concerning the horizontality and can capture an image with recognizing the compositions of the image to be captured in advance. Accordingly, the user can easily capture the image of the target at the proper angle.

Embodiment 5

Embodiment 5 of the present invention will be described with reference to FIGS. 18 and 19. FIG. 18 is a flowchart for an explanation of the image capturing operation of Embodiment 5. FIG. 19 is a view for an explanation of a correction scope. In the flowchart of FIG. 18, the same elements as Embodiment 4 will be denoted by the same reference numerals as used in Embodiment 4. Explanations of the elements will be omitted.

As shown in the flowchart of FIG. 18, if a user selects performing the horizontal correction (Y in S2200), the position detection unit 2140 detects a tilt angle of the mobile phone 2100 (S2230).

Next, based on the tilt angle, the image correction unit 2150 calculates the rotation correction scopes 2194a and 2194b only by the rotation (S2400). The rotation correction scopes 2194a and 2194b are scopes, which are rotated a scope 2190a and 2190b of the original image acquired from the image capturing unit 2120 based on the tilt angle by the image correction unit 2150.

On the other hand, as illustrated in FIG. 19, the image capturing unit 2120 in Embodiment 5 acquires an image in one rank larger size than a size designated by a user. For example, if QVGA (240×320) has been designated, an image in a VGA (640×480) size is acquired. If VGA has been designated, an image in a SVGA (800×600) size is acquired. If an image in a maximum size that can be acquired from the image capturing device has been designated, an image in the same size as the designated size is acquired. Hereinafter, an image in a larger size than a designated size will be referred to as a sensor image 2192a and 2192b.

The control unit 2110 determines whether the rotation correction scope 2194a and 2194b are within the scope of the sensor image 2192a and 2192b (S2410). As illustrated in FIG. 19(a), if the rotation correction scope 2194a is within the scope of the sensor image 2192a, the control unit 2110 selects the second correction mode (preview with a notification, without a correction) (Y in S2410).

Here, the rotation correction scope 2194a being within the scope of the sensor image 2192a means that the corrected image can be generated having the same resolution as the original image. In other words, with respect to the sensor image 2192, a dimension of the scope 2190a of the original image and a dimension of the rotation correction scope 2194a are the same. Also, the rotation correction scope 2194a being within the scope of the sensor image 2192a means that a tilt angle of the mobile phone 2100 is small. Accordingly, differences in the compositions between the original image and the corrected image become small.

In this case, when the control unit 2110 selects the second correction mode described in Embodiment 4, the preview display can be performed by the simple image processing. Since the notification is performed with the preview display, a user can capture an image with considering that the horizontal correction to the original image is to be performed (S2280 to S2340).

On the other hands, as illustrated in FIG. 9(b), if the correction scope is not within the scope of the sensor image, the control unit 2110 selects the first correction mode (preview by the image after the correction) (N in S2410).

In the case where the rotation correction scope 2194b is not within the scope of the sensor image 2192b, if the corrected image is generated in the state of the rotation correction scope 2194b, blanks are formed in corner portions of the corrected image. Accordingly, the corrected image (broken line scope 2106) is generated by reducing the acquired scope to fit the rotation correction scope 2194b into the scope of the sensor image 2192b, while maintaining the length and width ratio of the image.

Accordingly, the case where the rotation correction scope 2194b is not within the scope of the sensor image 2192b means the case where the scope 2190a of the original image and the rotation correction scope 2194a are different in the dimension. Thus, an effect is appeared in the resolution of the original image and the corrected image.

In this case, the control unit 2110 selects the first correction mode described in Embodiment 4. Accordingly, a user can capture an image while confirming the corrected image 2196 that has been corrected and varied, by the preview display (S2250 to S2340).

Also, in Embodiment 5, even after selecting the first or second correction mode, the control unit 2110 can switch the mode into the first or second correction mode in response to changing of a tilt angle of the mobile phone 2100.

As described above, according to the configuration of Embodiment 5, it is possible to not only automatically perform the horizontal correction to a captured image but also automatically select and perform the operation of the correction in accordance with situations. Accordingly, a user does not need to hold the mobile phone 2100 while concerning the horizontality. The user can capture an image while seeing the state of an image to be captured in advance. Accordingly, the user can easily capture an image of the target at the proper angle.

Additionally, in Embodiments 4 and 5, the mobile phone 2100 is held vertically, which is the same position as the calling. However, the correction can be performed even in the state that the mobile phone 2100 is held horizontally. For example, in the first correction mode, the position detection unit 2140 detects a tilt angle of the mobile phone 2100 to the vertical direction. If the vertically elongated image display unit 2130 is tilted at more than 45 degrees to the vertical direction and is to be in the horizontally elongated state, the display of the preview image is also switched into the horizontally elongated state so that horizontal correction can be performed.

The image correction unit 2150 may be capable of correcting an image so that an image has an angle set voluntarily by a user, not only the horizontal correction described in Embodiments 4 and 5. Accordingly, for example, a user can set an angle such as 15 degrees or 30 degrees to the horizontal direction and can easily and surely performed an intended expression to the image. The image correction unit 2150 may perform a perspective correction to an image based on the position detected by the position detection unit 2140, so that it is possible to acquire a corrected image, in which a distortion of a perspective direction of the original image is corrected.

As described, one aspect of the image capturing device of the present invention includes a housing, an image capturing unit capturing an image of a target, an image display unit capable of displaying the image, a position detection unit detecting a position of the housing, an image correction unit correcting an original image acquired from the image capturing unit, based on the position detected by the position detection unit, and a control unit controlling the image display unit to display a corrected image, which is acquired by correcting the original image, as a preview image.

Another configuration of the image capturing device of the present invention includes a housing, an image capturing unit capturing an image of a target, an image display unit capable of displaying the image, a position detection unit detecting a position of the housing, an image correction unit correcting an original image acquired from the image capturing unit based on the position detected by the position detection unit, and a control unit controlling the image display unit to display an image acquisition box indicating a scope of the original image to be corrected by the image correction unit on the image display unit, by overlapping with a preview image, when the preview image is displayed on the image display unit.

The control unit may preferably enlarge or reduce the image acquisition box based on the position detected by the position detection unit.

The position detection unit may preferably detect a tilt angle to a predetermined direction of the housing.

The image correction unit may correct the original image to fit the horizontal direction of a target to the left-right direction of the image capturing device.

The image correction unit may correct the original image based on a focus point.

The image capturing device may further include a face recognition unit for recognizing a face of a person to be the target, and the image correction unit may correct the original image based on the recognized face of the person.

The face recognition unit may be capable of recognizing a plurality of faces of persons at the same time, and the image correction unit may correct the original image based on a center point of the plurality of the faces of the persons.

The control unit may perform automatic exposure and automatic white balance based on an image within a scope to be corrected by the image correction unit.

The housing may have a foldable structure with a hinge, and the image capturing by the image capturing device may be performed in the state that the housing is open.

One aspect of the image capturing method of the present invention includes: capturing an image of a target by using an image capturing device; detecting a position of the image capturing device, correcting a captured original image based on the detected position; and displaying a corrected image acquired by correcting the original image, as a preview image.

One aspect of the image capturing method of the present invention includes: capturing an image of a target by using an image capturing device; detecting a position of the image capturing device; acquiring a scope to be corrected based on the detected position; and displaying an image acquisition box indicating the scope to be corrected, by overlapping with a preview image, while displaying the preview image.

One aspect of the image capturing device of the present invention includes: a housing; an image capturing unit capturing an image of a target, an image display unit capable of displaying the image, a position detection unit detecting a position of the housing; and an image correction unit correcting an original image acquired from the image capturing unit based on the position detected by the position detection unit.

The image capturing device may further includes the notification unit performing a notification in a predetermined manner, and the notification unit may preferably notifies that the correction to the original image is to be performed by the image correction unit in the predetermined manner, while displaying the preview image.

The predetermined manner may preferably includes one or more of a display of an icon, a display of a predetermined character, light emission of LED, and a lighting of a light of a key pad.

The image capturing device may further includes the image recording unit to store an image, and the image recording unit may preferably stores a corrected image, which has been corrected by the image correction unit.

The image recording unit may store both the corrected image and the original image prior to the correction.

The position detection unit may preferably detect a tilt angle of the housing to a predetermined direction.

The predetermined direction may be a horizontal direction or a voluntary set direction.

The image correction unit may preferably rotate the original image to fit the horizontal direction of a target to the left-right direction of the image capturing device.

The housing may have a foldable structure with a hinge, and the image capturing by the image capturing device may be preferably performed in the state that the housing is open.

One aspect of the image capturing method of the present invention is characterized by capturing an image of a target by using an image capturing device, detecting a position of the image capturing device, and correcting a captured original image based on the detected position.

One aspect of the image capturing device of the present invention includes a housing: an image capturing unit capturing an image of a target, an image display unit capable of displaying the image, a position detection unit detecting a position of the housing, an image correction unit correcting an original image acquired from the image capturing unit based on a position detected by the position detection unit; and a control unit that, in response to the position detected by the position detection unit, performs one of a first correction mode displaying the corrected image, which is acquired by correcting the original image on the image display unit, as a preview image, and a second correction mode notifying that a correction to the original image is to be performed while displaying the preview image.

The position detection unit may detects a tilt angle of the housing to a predetermined direction, and the control unit may perform switching of the first correction mode and the second correction mode in response to the detected tilt angle.

If it is determined that the detected tilt angle is more than a predetermined value, the control unit may perform the first correction mode. If it is determined, that the detected tilt angle is equal to or less than the predetermined value, the control unit may perform the second correction mode.

The image correction unit may rotate the original image to fit the horizontal direction of a target to the left-right direction of the image capturing device.

The image capturing unit may be capable of outputting a sensor image, which is lager than the original image. If it is determined that the corrected scope acquired by rotating the scope of the original image is not within the sensor image, the control unit may perform the first correction mode. If it is determined that the corrected image is within the sensor image, the control unit may perform the second correction mode.

The housing has a foldable structure with a hinge, and the image capturing by the image capturing device may be performed in the state that the housing is open.

In order to resolve the foregoing problems, a representative configuration of the image capturing method of the present invention is realized by: capturing an image of a target by using an image capturing device; detecting a position of the image capturing device; performing one of displaying a corrected image, which is acquired by correcting a captured original image based on the position, as a preview image before a shutter is pressed, and notifying that a correction to the original image is to be performed, based on the position while displaying the preview image, in response to the detected position.

The present invention has been described in detail or with reference to specific embodiments. However, it is apparent to one skilled in the art that various modifications and alterations may be added without departing from the spirit and the scope of the present invention.

The present application is based on the Japanese patent applications (Japanese Patent Application No. 2009-101888 filed on Apr. 20, 2009; Japanese Patent Application No. 2009-101889 filed on Apr. 20, 2009; and Japanese Patent Application No. 2009-101890 filed on Apr. 20, 2009), the disclosures of which are herein incorporated by reference.

INDUSTRIAL APPLICABILITY

The present invention can be used as an image capturing device and an image capturing method for capturing an image of a target.

The invention claimed is:
1. An image capturing device comprising:
a housing;
an image capturing unit capturing an image of a target;
an image display unit capable of displaying the image;
a position detection unit detecting a position of the housing;

an image correction unit correcting an original image acquired from the image capturing unit based on the position detected by the position detection unit; and a control unit that is configured to switch between:

a first mode displaying the corrected image as a preview image; and a second mode displaying the original image as a preview image, with notifying that a correction to the displayed original image is to be performed, wherein after a selection of one of the first mode or the second mode, the control unit is configured to switch to the other of the first mode and the second mode in accordance with the position detected by the position detection unit.

2. The image capturing device claimed in claim 1, wherein the control unit controls the image display unit to display a corrected image, which is acquired by correcting the original image, as a preview image.

3. The image capturing device claimed in claim 1, wherein the control unit controls the image correction unit to display an image acquisition box indicating a scope of the original image to be corrected, by overlapping with the preview image, when the preview image is displayed on the image display unit.

4. The image capturing device claimed in claim 3, wherein the control unit enlarges or reduces the image acquisition box based on the positioned detected by the position detection unit.

5. The image capturing device claimed in claim 1, wherein the image correction unit corrects the original image to fit a horizontal direction of the target to a left-right direction of the image capturing device.

6. The image capturing device claimed in claim 1, wherein the image correction unit corrects the original image based on a focus point.

7. The image capturing device claimed in claim 1, further comprising a face recognition unit recognizing a face of a person to be a target, wherein the image correction unit corrects the original image based on the recognized face of the person.

8. The image capturing device claimed in claim 7, wherein the face recognition unit is capable of recognizing a plurality of the faces of the persons at the same time, and wherein the image correction unit corrects the original image based on a center point of the plurality of the faces of the persons.

9. The image capturing device claimed in claim 2, wherein the control unit performs automatic exposure and automatic white balance based on an image within a scope to be corrected by the image correction unit.

10. The image capturing device claimed in claim 1, wherein the housing has a foldable structure with a hinge, and wherein the image capturing by the image capturing device is performed in a state that the housing is open.

11. The image capturing device claimed in claim 1, wherein the position detection unit detects a tilt angle of the housing to a predetermined direction, and wherein the control unit performs a switching of the first mode and the second mode, in response to the tilt angle detected by the position detection unit.

12. The image capturing device claimed in claim 11, wherein, when it is determined that the tilt angle detected by the position detection unit is more than a predetermined value, the control unit performs the first mode, and wherein, when it is determined that the tilt angle detected by the position detection unit is equal to or less than the predetermined value, the control unit performs the second mode.

13. The image capturing device claimed in claim 1, wherein the image correction unit rotates the original image to fit a horizontal direction of the target to a left-right direction of the image capturing device.

14. The image capturing device claimed in claim 13, wherein the image capturing unit is capable of outputting a sensor image, which is larger than the original image, and wherein the control unit performs the first mode if it is determined that a correction scope acquired by rotating the scope of the original image is not within the sensor image, and the second mode if it is determined that the correction scope is within the sensor image.

15. The image capturing device claimed in claim 1, further comprising a notification unit performing a notification in a predetermined manner, wherein the notification unit notifies a correction to the original image is to be performed by the image correction unit, in the predetermined manner while displaying the preview image.

16. The image capturing device claimed in claim 15, wherein the predetermined manner includes one or more of a display of an icon, a display of a predetermined character, light emission of LED, and a lighting of a light of a key pad.

17. The image capturing device claimed in claim 15, further comprising an image recording unit storing an image, wherein the image recording unit stores a corrected image that has been corrected by the image correction unit.

18. The image capturing device claimed in claim 17, wherein the image recording unit stores both the corrected image and the original image prior to correction.

19. An image capturing device comprising:

a housing;

an image display unit capable of displaying the image;

a position detection unit detecting a position of the housing; and an image correction unit correcting an original image acquired from the image capturing unit based on the position detected by the position detection unit, wherein said correcting by the image correction unit corrects the original image by rotating the original image with setting an object or a face of a person in the original image as the center of rotation.

* * * * *